United States Patent
Clarke et al.

(10) Patent No.: US 9,477,253 B2
(45) Date of Patent: Oct. 25, 2016

(54) STEERING SYSTEM FOR A MARINE VESSEL

(71) Applicant: MARINE CANADA ACQUISITION, INC., Richmond (CA)

(72) Inventors: Douglas Clarke, Bradenton, FL (US); Pierre Garon, Trois-Rivieres (CA); Ray Wong, Richmond (CA); Anson Chan, Richmond (CA); Kristofer Sven Smeds, Vancouver (CA); David Higgs, Vancouver (CA); Richard Redfern, Richmond (CA)

(73) Assignee: Marine Canada Acquisition Inc. (CA)

( * ) Notice: Subject to any disclaimer, the term of this patent is extended or adjusted under 35 U.S.C. 154(b) by 0 days.

(21) Appl. No.: 14/378,863

(22) PCT Filed: Feb. 14, 2013

(86) PCT No.: PCT/US2013/026163
§ 371 (c)(1),
(2) Date: Aug. 14, 2014

(87) PCT Pub. No.: WO2013/123208
PCT Pub. Date: Aug. 22, 2013

(65) Prior Publication Data
US 2015/0034001 A1 Feb. 5, 2015

Related U.S. Application Data

(60) Provisional application No. 61/598,701, filed on Feb. 14, 2012.

(51) Int. Cl.
| | |
|---|---|
| *B63H 25/22* | (2006.01) |
| *G05G 1/08* | (2006.01) |
| *B63H 25/24* | (2006.01) |
| *B62D 15/02* | (2006.01) |
| *B63H 25/52* | (2006.01) |

(Continued)

(52) U.S. Cl.
CPC .............. *G05G 1/082* (2013.01); *B62D 5/001* (2013.01); *B62D 5/006* (2013.01); *B62D 15/02* (2013.01); *B63H 25/02* (2013.01); *B63H 25/24* (2013.01); *B63H 25/30* (2013.01); *B63H 25/42* (2013.01);
(Continued)

(58) Field of Classification Search
CPC ........ G05G 1/082; G05G 5/04; G05G 9/047; B62D 5/001; B62D 5/006; B62D 15/02; B63H 25/02; B63H 25/52; B63H 25/24; B63H 2025/026; B63H 2025/022
USPC ......... 114/144 R, 144 RE, 150; 440/53.61 R, 440/61 S, 61 A, 62, 63
See application file for complete search history.

(56) References Cited

U.S. PATENT DOCUMENTS

| | | |
|---|---|---|
| 6,592,412 B1 | 7/2003 | Geil et al. |
| 7,258,072 B2 | 8/2007 | Wong et al. |

(Continued)

*Primary Examiner* — Anthony Wiest
(74) *Attorney, Agent, or Firm* — Berenato & White, LLC

(57) ABSTRACT

A steering system for a marine vessel comprises a helm, a control head, and a joystick. The helm and control head may respectively provide user inputted steering commands and user inputted shift and throttle commands on a first CAN network. The joystick and the control head may respectively provide user inputted steering commands and user inputted shift and throttle commands on a second CAN network. The helm may provide user inputted steering commands on the first CAN network. The control head may provide user inputted shift and throttle commands on the second CAN network. The joystick may provide user inputted steering commands and user inputted shift and throttle commands on either the first CAN network or the second CAN network.

7 Claims, 20 Drawing Sheets

(51) Int. Cl.
    *B63H 25/02*    (2006.01)
    *B62D 5/00*     (2006.01)
    *G05G 9/047*    (2006.01)
    *G05G 5/04*     (2006.01)
    *B63H 25/30*    (2006.01)
    *B63H 25/42*    (2006.01)
    *B63H 20/00*    (2006.01)
    *B63H 21/21*    (2006.01)

(52) U.S. Cl.
    CPC .............. *B63H 25/52* (2013.01); *G05G 5/04* (2013.01); *G05G 9/047* (2013.01); *B63H 2020/003* (2013.01); *B63H 2021/216* (2013.01); *B63H 2025/022* (2013.01); *B63H 2025/026* (2013.01)

(56) References Cited

U.S. PATENT DOCUMENTS

| | | |
|---|---|---|
| 2001/0015165 A1 | 8/2001 | McKenney et al. |
| 2005/0170712 A1 | 8/2005 | Okuyama |
| 2005/0229834 A1 | 10/2005 | Wong et al. |
| 2006/0042532 A1 | 3/2006 | Wong et al. |
| 2006/0252316 A1 | 11/2006 | Tawa et al. |
| 2010/0023192 A1 | 1/2010 | Rae et al. |
| 2010/0138083 A1 | 6/2010 | Kaji |
| 2011/0166724 A1* | 7/2011 | Hiramatsu ........... B63H 21/213 701/21 |
| 2011/0195816 A1 | 8/2011 | Martin et al. |
| 2011/0301788 A1 | 12/2011 | Leehaug et al. |

* cited by examiner

HS-CAN: High Speed CAN Bus
Opto HS-CAN: Optically Isolated High Speed CAN Bus
FT-CAN: Fault Tolerant CAN Bus
USB UART: Universal Serial Bus to Universal Asynchronous Receiver / Transmitter Interface
EXP CAN SPI: Expansion Port, CAN Bus, and Serial Peripheral Interface
RFU: Rudder Feedback Unit
MCU: Microcontroller HS-CAN: High Speed CAN Bus
Opto HS-CAN: Optically Isolated High Speed CAN Bus
FT-CAN: Fault Tolerant CAN Bus
USB UART: Universal Serial Bus to Universal Asynchronous Receiver / Transmitter Interface
EXP CAN SPI: Expansion Port, CAN Bus, and Serial Peripheral Interface
RFU: Rudder Feedback Unit
MCU: Microcontroller

| Battery Switching Matrix | Second Battery | Second Battery Weak | Second Battery Low | Second Battery High | |
|---|---|---|---|---|---|
| First Battery Normal | | Switch to First Battery (50%) | Switch to First Battery (50%) | Switch to First Battery (50%) | Normal operation |
| First Battery Weak | Switch to Second Battery (50%) | (Switching) to Own (50%) | Switch to First Battery (25%) | Switch to First Battery (25%) | Battery Switch (Derated % performance) |
| First Battery Low | Switch to Second Battery (50%) | Switch to Second Battery (25%) | (Switching) to Own | Switch to First Battery | Freeze, not overridable |
| First Battery High | Switch to Second Battery (50%) | Switch to Second Battery (25%) | Switch to Second Battery | | Potential Damage to PCM |

FIG. 10

| Battery Fault Conditions | | |
|---|---|---|
| | Fault Condition | Clear Condition |
| Normal | Not applicable | Not applicable |
| Weak | 30 seconds<br>Battery Voltage < 11.5 Volts | 30 seconds<br>Battery Voltage > 12.5 Volts and<br>Time since last fault trigger > $n^2$ second |
| Low | 1 millisecond<br>Battery Voltage < 8 Volts | 1 millisecond<br>Battery Voltage > 12.5 Volts and<br>Time since last fault trigger > $n^2$ second |
| High | 1 millisecond<br>Battery Voltage > 24 Volts | 1 millisecond<br>Battery Voltage < 16 Volts and<br>Time since last fault trigger > $n^2$ second |

*$n$ = number of faults causing battery switch

FIG. 11

STEERING SYSTEM FOR A MARINE VESSEL

CROSS-REFERENCE TO RELATED APPLICATION

This application is a national stage application of International Application No. PCT/US2013/026163 filed Feb. 14, 2013, which claims the benefit of provisional application 61/598,701 filed in the United States Patent and Trademark Office on Feb. 14, 2012, the disclosure of which is incorporated herein by reference and priority to which is claimed.

BACKGROUND OF THE INVENTION

1. Field of the Invention

The present invention relates to steering systems and, in particular, to a steering system for docking a marine vessel.

2. Description of the Related Art

In conventional steering systems for docking a marine vessel an operator uses a joystick to maneuver the marine vessel. The joystick allows the operator to maneuver the marine vessel in lateral direction, i.e. in a direction which is substantially perpendicular to a longitudinal axis of the marine vessel. This lateral directional movement is achieved by independently steering the propulsion units of the marine vessel to effect vector thrusting. For example, in a marine vessel provided with two propulsion units, shifting one of the propulsion units into reverse and simultaneously shifting the other propulsion unit into forward while selectively adjusting the steering angles of the propulsion units can cause the marine vessel to move in a lateral direction. The joystick controls both steering functions and shift and control functions during docking. The conventional steering systems are also typically provided with a helm for steering the marine vessel on open water and a control levers for controlling shift and throttle functions on open water.

An example of a conventional steering system for docking a marine vessel disclosed in U.S. Pat. No. 6,994,046 which issued on Dec. 23, 2008 to Kaji et al. The steering system disclosed by Kaji et al. includes a helm, a control lever, a joystick, and a pair of propulsion units. The helm and control lever are used to maneuver the vessel in an ordinary running mode in which the steering angles of the propulsion units are substantially equal to each other. The joystick is used to maneuver the vessel in a lateral movement mode in which the steering angles of the propulsion units are independently adjusted to achieve lateral movement of the marine vessel. The steering system is operative in the ordinary running mode when input from the helm or control lever is detected and is operative in the lateral movement mode when input from the joystick is detected. It accordingly may not be possible to use the joystick in the ordinary running mode.

SUMMARY OF THE INVENTION

It is an object of the present invention to provide an improved steering system for a marine vessel.

There is accordingly provided a steering system for a marine vessel comprising a first engine, a first hydraulic steering actuator for steering the first engine, a first hydraulic pump for supplying hydraulic fluid to the first steering actuator, a first shift actuator for shifting gears in the first engine, and a first throttle actuator for increasing or decreasing throttle to the first engine. There is also a second engine, a second hydraulic steering actuator for steering the second engine, a second hydraulic pump for supplying hydraulic fluid to the second steering actuator, a second shift actuator for shifting gears in the second engine, and a second throttle actuator for increasing or decreasing throttle to the second engine.

A pump control module controls an output of the first hydraulic pump and an output of the second hydraulic pump. A helm provides user inputted steering commands to the pump control module. A joystick provides user inputted steering commands to the pump control module. A control head provides user inputted shift and throttle commands to the first shift actuator and the first throttle actuator and user inputted shift and throttle commands to the second shift actuator and the second throttle actuator. An electronic autopilot interface may also provide steering commands to the pump control module in autopilot mode. The joystick may provide user inputted shift and throttle commands to the first shift actuator and the first throttle actuator. The joystick may provide user inputted shift and throttle commands to the second shift actuator and the second throttle actuator.

The helm and the control head may respectively provide user inputted steering commands and user inputted shift and throttle commands on a first CAN network. The joystick and the control head may respectively provide user inputted steering commands and user inputted shift and throttle commands on a second CAN network. The helm may provide user inputted steering commands and/or system feedback on the first CAN network. The control head may provide user inputted shift and throttle commands and/or system feedback on the second CAN network. The joystick may provide user inputted steering commands, user inputted shift and throttle commands, and/or system feedback on either the first CAN network or the second CAN network. The pump control module and the joystick may provide user inputted commands and system feedback and/or similar state variables on either the first CAN network or the second CAN network.

The helm may provide user inputted steering commands on the first CAN network while the joystick provides user inputted shift and throttle commands on the second CAN network. The control head may provide user inputted shift and throttle commands on a first CAN network while the joystick provides user inputted steering commands on the second CAN network. An electronic auto-pilot interface may provide computed steering commands on the second CAN network while the control head or the joystick provides user inputted shift and throttle commands on the first CAN network or the second CAN network. The first CAN network and the second CAN networks may be in either serial communication or wireless communication.

There is also provided a steering system for a marine vessel comprising a first engine, a first hydraulic steering actuator for steering the first engine, and a first hydraulic pump for supplying hydraulic fluid to the first steering actuator. There is also a second engine, a second hydraulic steering actuator for steering the second engine, and a second hydraulic pump for supplying hydraulic fluid to the second steering actuator. A pump control module controls an output of the first hydraulic pump and an output of the second hydraulic pump. The first hydraulic pump and the second hydraulic pump each have a battery and the pump control module causes the battery of one of the first hydraulic pump or the second hydraulic pump to supply power to both the first hydraulic pump and the second hydraulic pump when the battery of the other one of the first hydraulic pump or the second hydraulic pump is weak.

There is also provided a steering system for a marine vessel comprising a first engine, a first hydraulic steering actuator for steering the first engine, and a first hydraulic pump for supplying hydraulic fluid to the first steering actuator. There is also a second engine, a second hydraulic steering actuator for steering the second engine, and a second hydraulic pump for supplying hydraulic fluid to the second steering actuator. A pump control module controls an output of the first hydraulic pump and an output of the second hydraulic pump based on a position of the first engine relative to the second engine. The pump control module may control the output of the first steering actuator and the output of the second steering actuator based on an angle between an engine longitudinal axis of the first engine and an engine longitudinal axis of the second engine. The first engine and the second engine may be outboard engines. The pump control module may control the output of the first steering actuator and the output of the second steering actuator based on the speed of the first and the second engine. The pump control module may control the output of the first steering actuator and the output of the second steering actuator based on the speed of the vessel. The pump control module control the output of the first steering actuator and the output of the second steering actuator based on the shift and throttle commands to the first and second engine.

There is also provided a steering system for a marine vessel comprising a helm. The helm comprises a rotatable steering shaft and a sensor which senses angular movement of the steering shaft as the vehicle is being steered. An electromagnetic actuator actuates a stop mechanism to releasably engage the steering shaft. There is a microcontroller which processes a steering sensor signal and causes the electromagnetic actuator to actuate the stop mechanism to fully engage the steering shaft when the sensor senses that the steering shaft has reached a hardstop position to prevent rotation of the steering shaft in a first rotational direction, which corresponds to movement towards the hardstop position, while allowing rotational play between the steering shaft and the stop mechanism in a second direction, which corresponds to rotational movement away from the hardstop position. A driver applies a reserve polarity pulse to the electromagnetic actuator when the stop mechanism is fully engaged with the steering shaft and the steering shaft is rotated, as permitted by the rotational play, in the second rotational direction.

The helm may vary the number of turns between hard stops based on the first engine speed and the second engine speed. The helm may vary the number of turns between hard stops based on marine vessel speed. The helm may vary the number of turns between hard stops based on control head user inputted shift and throttle commands to the first and control head user inputted shift and throttle commands to the second engine. The helm may vary the steering wheel resistance based on the first engine speed and the second engine speed. The helm may vary the steering resistance based on marine vessel speed. The helm may vary the steering resistance based on control head user inputted shift and throttle commands to the first and second engine. The helm may turn between hard stops based on the speed of the marine vessel. The helm may turn between hard stops based on the shift and throttle commands to the first engine and the shift and throttle commands to the second engine.

BRIEF DESCRIPTIONS OF DRAWINGS

The invention will be more readily understood from the following description of the embodiments thereof given, by way of example only, with reference to the accompanying drawings, in which:

FIGS. 4A to 5C are schematics of switches integrated into the H-driver bridge of the helm of the steering system of FIG. 1;

FIG. 5 are graphs illustrating H-Bridge PWM control logic of the helm of the steering system of FIG. 1;

FIG. 10 is a table showing a battery switching matrix of the pump control module of FIG. 8;

FIG. 11 is a table showing battery fault conditions of the pump control module of FIG. 8;

DESCRIPTIONS OF THE PREFERRED EMBODIMENTS

Figure 1:
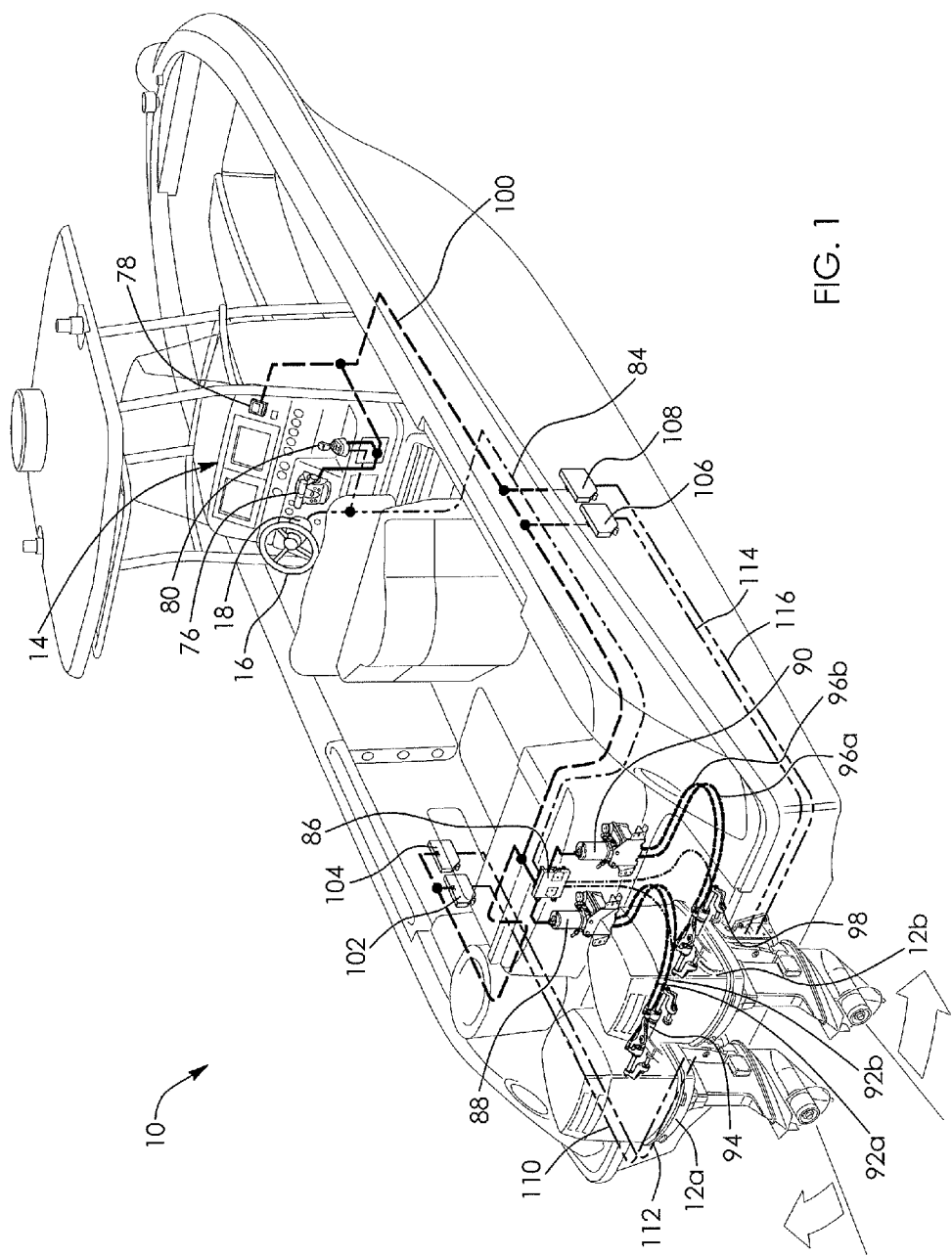
FIG. 1 is a perspective view of a marine vessel provided with an improved steering system.
Figure 2:
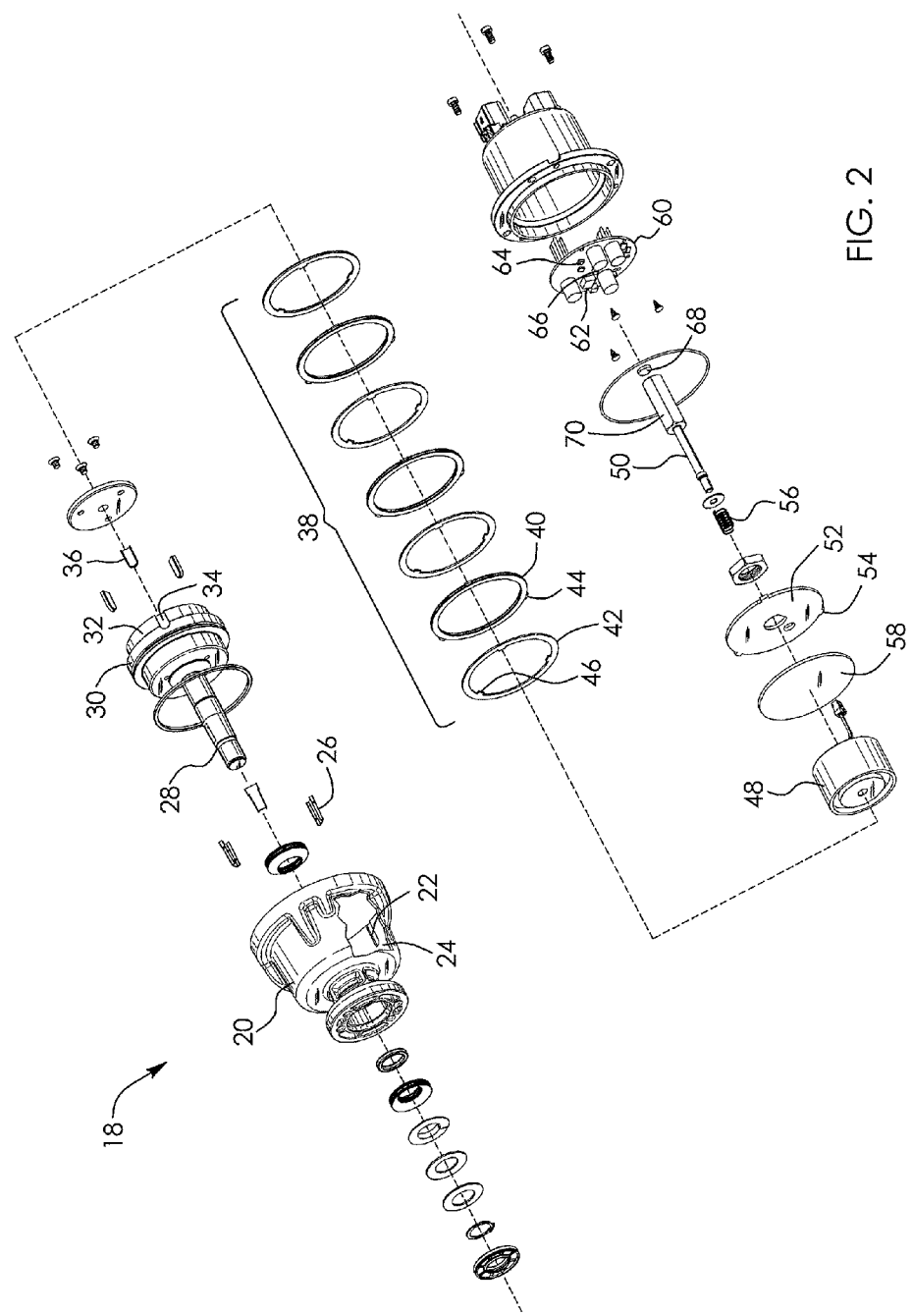
FIG. 2 is an exploded view of a helm of the steering system of FIG. 1.

Referring to the drawings and first to FIG. 1, this shows a marine vessel 10 which is provided with propulsion units in the form of outboard engines 12a and 12b. In this example there are two engines, namely, a port engine 12a and a starboard engine 12b. However, in other examples, the marine vessel may be provided with any suitable number of engines. It is common to have one engine or as many as five engines in pleasure marine vessels. The marine vessel 10 is also provided with a control station 14 that supports a steering wheel 16 mounted on a helm 18. The steering wheel 16 is conventional and the helm 18 is shown in greater detail in FIG. 2.

The helm 18 is improved over the helm disclosed in U.S. Pat. No. 7,137,347 which issued on Nov. 21, 2006 to Wong et al. and the full disclosure of which is incorporated herein by reference. The helm 18 includes a housing 20 which is shown partially broken away in FIG. 2. There is a plurality of circumferentially spaced-apart axially extending grooves, for example groove 22, on an inner wall 24 the housing 20. There is also a plurality of resilient channel-shaped inserts, for example insert 26, each of which is received by a corresponding one of the grooves on the inner wall of the housing. A steering shaft 28 extends through the housing 20. The steering wheel 16, shown in FIG. 1, is mounted on the steering shaft 28. The steering shaft 28 includes a hollow drum portion 30 which has a cylindrical outer wall 32. There is a plurality of circumferentially spaced-apart grooves, for example groove 34, extending axially on the cylindrical outer wall 32 of the hollow drum 30. There is also a plurality of resilient channel-shaped inserts, for example insert 36, each of which is received by a corresponding one of the grooves on the cylindrical outer wall of the hollow drum.

The helm 18 further includes a multi-plate clutch 38. There are two types of interposed substantially annular clutch plates in the multi-plate clutch 38. Clutch plate 40 is an exemplar of a first type of the clutch plate and clutch plate 42 is exemplar of a second type of clutch plate. The first type of clutch plate each have exterior projections, for example spline 44 shown for clutch plate 40, which are positioned to engage the grooves 22 on the inner wall 24 of the housing 20. The clutch plates 40 are thus axially slidable but non-rotational within the housing 20. The inserts 26 in the grooves 22 on the inner wall 24 of the housing 20 may provide dampened motion and additional position control. The second type of clutch plate each have interior projections, for example spline 46 as shown for clutch plate 42, that are positioned to engage the grooves 34 on the cylindrical outer wall 32 of the hollow drum 30 of the steering shaft 28. The clutch plates 42 are thus axially slidable with respect to the steering shaft 28. A limited amount of rotational movement is also permitted between the clutch plates 42 and the steering shaft 28 because the grooves 34 on the steering shaft 28 are wider than the splines 46 on the clutch plates 42. The inserts 36 in the grooves 34 may provide dampened motion and additional position control.

The helm 18 further includes an actuator in the form of an electromagnetic actuator which, in this example, includes an electromagnetic coil 48 and an armature 50. The electromagnetic coil 48 is mounted on a circular mounting plate 52. The circular mounting plate has exterior projections, for example spline 54, which are positioned to engage the grooves 22 on the inner wall of the housing 20 such that the mounting plate 52 is axially slidable but non-rotational within the housing 20. The armature 50 is coupled to the steering shaft 28. When the electromagnetic coil 48 is energized, the electromagnetic coil 48 and the mounting plate 52 are drawn along the armature 50 to force the clutch plates 40 and 42 together. Since the first type of clutch plates 40 are non-rotatable with respect to the housing 20 and the second type of clutch plates 42 are non-rotatable with respect to the steering shaft 28, apart from the rotational play discussed above, friction between the clutch plates 40 and 42, when the electromagnetic coil 48 is energized, causes the stop mechanism to brake the helm 18, i.e. stop rotation of the steering shaft 28 relative to the housing 20.

There is a spring 56 which preloads the clutch plates 40 and 42 for improved gap control between the clutch plates 40 and 42. The spring 56 performs two functions, namely, counteracting gravitational forces which may pull the clutch plates 40 and 42 apart and providing passive background steering resistance by partially forcing the clutch plates 40 and 42 together. The helm 18 may also be provided with a shim 58 between the electromagnetic coil 48 and the mounting plate 52. The shim 58 is a liquid shim in this example. The shim 58 sets the electromagnetic coil 48 and the mounting plate 52 apart by a predetermined clearance and which allows for consistency in the attractive force of the magnetic field.

The helm 18 further includes a circuit board 60 upon which is mounted a microcontroller 62, an H-bridge driver 64, and a rotational sensor 66. The microcontroller 62 controls current supplied to the electromagnetic coil 48 to provide dynamic steering resistance. The H-bridge driver 64 is responsible for energizing or applying current to the electromagnetic coil 48 to both vary steering resistance and brake the helm 18. The H-bridge driver 64 may also apply a reverse polarity pulse to the electromagnetic coil 48 when the steering shaft is rotated away from a hardstop. The rotational sensor 66 detects rotation of the steering shaft 28. In this example, a magnet 68 is disposed on an end of a shaft 70 of the armature 50 which rotates with the steering shaft 28. The rotational sensor 66 detects rotation of the magnet 68 and, accordingly, rotation of the steering shaft 28 and steering wheel 16.

Dynamic steering resistance is accomplished through pulse width modulation (PWM) of current supplied to the electromagnetic coil 48. The electromagnetic coil 48 may thereby only be partially energized, resulting in some friction between the clutch plates 40 and 42 but not sufficient to friction to stop the steering shaft 28 from rotating. The amount of steering resistance can be adjusted by the microcontroller 62 for different circumstances. For example, when the steering wheel 16 and steering shaft 28 are rotated too fast or the outboard engines 12a and 12b are heavily loaded, the outboard engines may be prevented from keeping up with the helm 18. The steering resistance can then be made greater to provide feedback to the operator, slowing down the rate of rotation of the steering wheel 16 and steering shaft 28. The steering resistance can also be made greater at higher boat speeds and lower at low boat speeds as encountered during docking. Greater steering resistance can also be used to indicate that the battery charge is low to discourage fast or unnecessary movements of the helm. Steering resistance can also be made greater to provide a proactive safety feature for non-safety critical failures. By imposing a slight discomfort to the operator, this intuitive sensation feedback alerts the operator that the steering system behaves in a reduced performance steering mode, encouraging the operator to slow down the boat or return to dock. It will be appreciated that the spring 56 also provides steering resistance and accordingly there may be steering resistance even when the electromagnetic coil 48 is not energized. This allows for power conservation while still having steering resistance.

Figure 3:
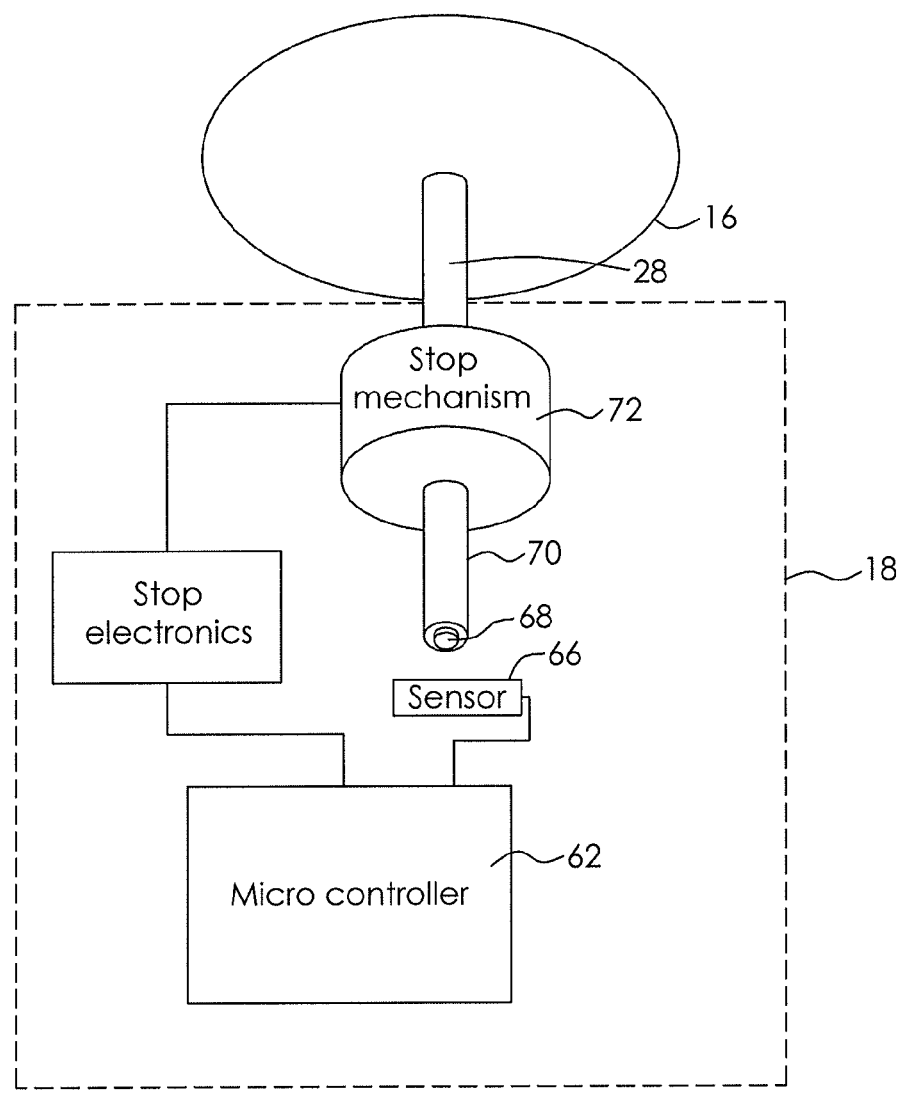
FIG. 3 is a diagrammatic view of the helm of the steering system of FIG. 1.

The microcontroller 62 also drives the H-Bridge driver 64 to energize the electromagnetic coil 48 to actuate a stop mechanism 72, shown in FIG. 3, to brake the helm 18, i.e. to stop rotation of the steering shaft 28. Braking occurs when the rotational sensor 66 senses that the steering shaft has reached a hardstop position based on a steering angle. The stop mechanism 72 is generally comprised of the multi-plate clutch 38, shown in FIG. 2, the plates of which are urged into frictional engagement with one another by the electromagnetic actuator to restrict rotation of the steering shaft 28. In particular, the stop mechanism 72 is actuated to fully engage the steering shaft 28 to prevent rotation of the steering shaft 28 in a first rotational direction, which corresponds to movement towards the hardstop position, while allowing rotational play between the steering shaft 28 and the stop mechanism 72 in a second direction, which corresponds to rotational to rotational movement away from the hardstop position, when the sensor senses the steering shaft has reached a hardstop position.

Figure 4C:
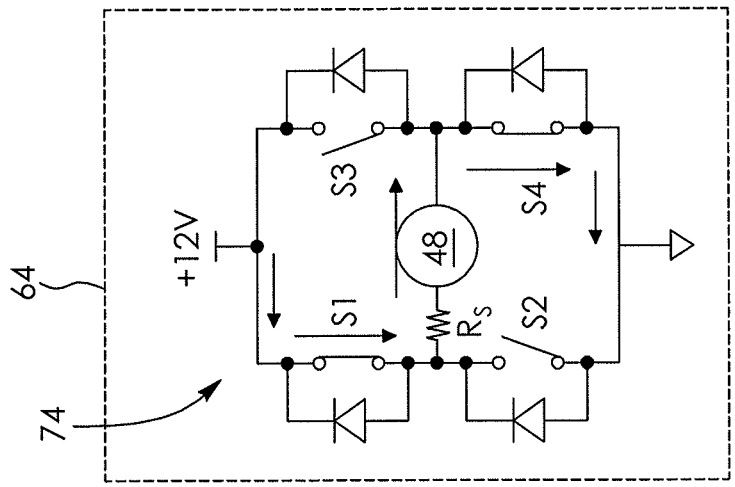
Figure 4B:
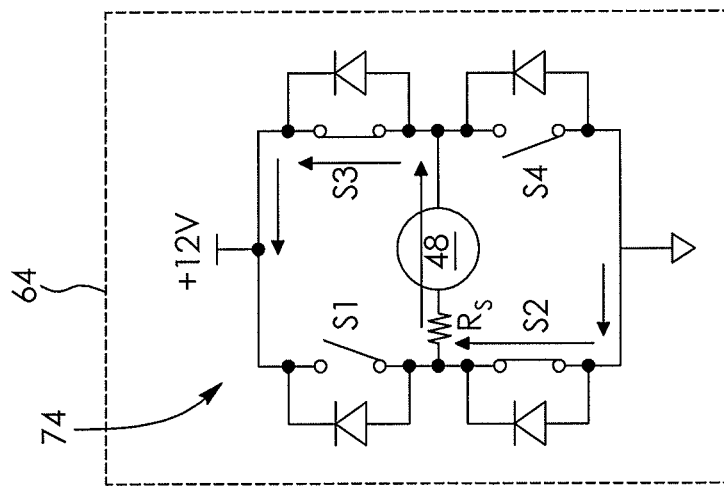
Figure 4A:
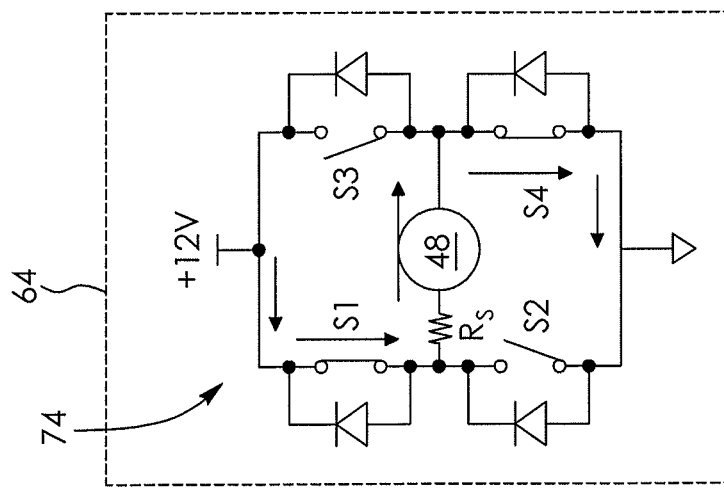

The H-bridge driver 64 applies a reserve polarity pulse to the electromechanical actuator when the stop mechanism 72 is fully engaged with the steering shaft 28 and the steering shaft is rotated, as permitted by the rotational play, in the second rotational direction. In this example, the H-bridge driver is a STMicroelectronics VNH2SP30-E but any suitable H-bridge driver may be used. As shown in FIGS. 4A to 4C, four switches S1, S2, S3 and S4 are integrated into the H-bridge driver 64 and are arranged as an H-bridge 74 to switch the polarity of the current going to the electromagnetic coil 48. There is a current shunt Rs, in this example, for measuring the current passing through the electromagnetic coil 48, but this is not required. In this example, the PWM to the H-bridge 74 is a signed magnitude of 20 kHz PWM. The function of the H-bridge 74 is to reduce the magnetic remanence/hysteresis effect. This results in a steering effort for a given steering PWM remaining substantially the same before and after a hardstop. In alternative examples the H-bridge 74 may have another means such as an internal current sensing sensor to measure current passing through the electromagnetic coil.

In operation, when a hardstop is reached a hardstop PWM of, for example, is +100% is applied and S2 and S3 are open while S1 and S4 are closed as shown in FIG. 4A. Current flows from a 12V power source through S1 into the electromagnetic coil 48 and then through S4 to ground. When the rotational sensor 66 senses that the steering shaft 28 is being rotated away from the hardstop, as permitted by the rotational play, the microcontroller 62 drives the H-bridge driver 64 to apply a reverse polarity pulse for a fixed duration of time which is determined by the characteristics of the electromagnetic coil 48. In this example, a reverse polarity pulse is applied for approximately 15 to 20 milliseconds at a moment when steering away from the hardstop occurs. During the application of the reverse polarity pulse, S2 and S3 are closed while S1 and S4, are open as shown in FIG. 4B. A reverse polarity pulse of, for example, −100% is applied. Current flows to ground through S2, electromagnetic coil 48, S3 and then back to the 12V power source. This transition from current flowing in one polarity, as shown in FIG. 4A, to current flowing in the reverse polarity, as shown in FIG. 4B, causes the electromagnetic coil 48 current to rapidly decay as it is flowing against the full force of the power voltage supply. As steering continues away from the hardstop there is a steering PWM of, for example +10% to +20%, and S1 and S4 are closed as shown FIG. 4C. The current flows in the same direction as when the stop mechanism 72 of the steering mechanism is fully engaged but the PWM is reduced to provide a steering resistance. A reduced steering effort is accordingly required when steering away from a hardstop.

Figure 5:
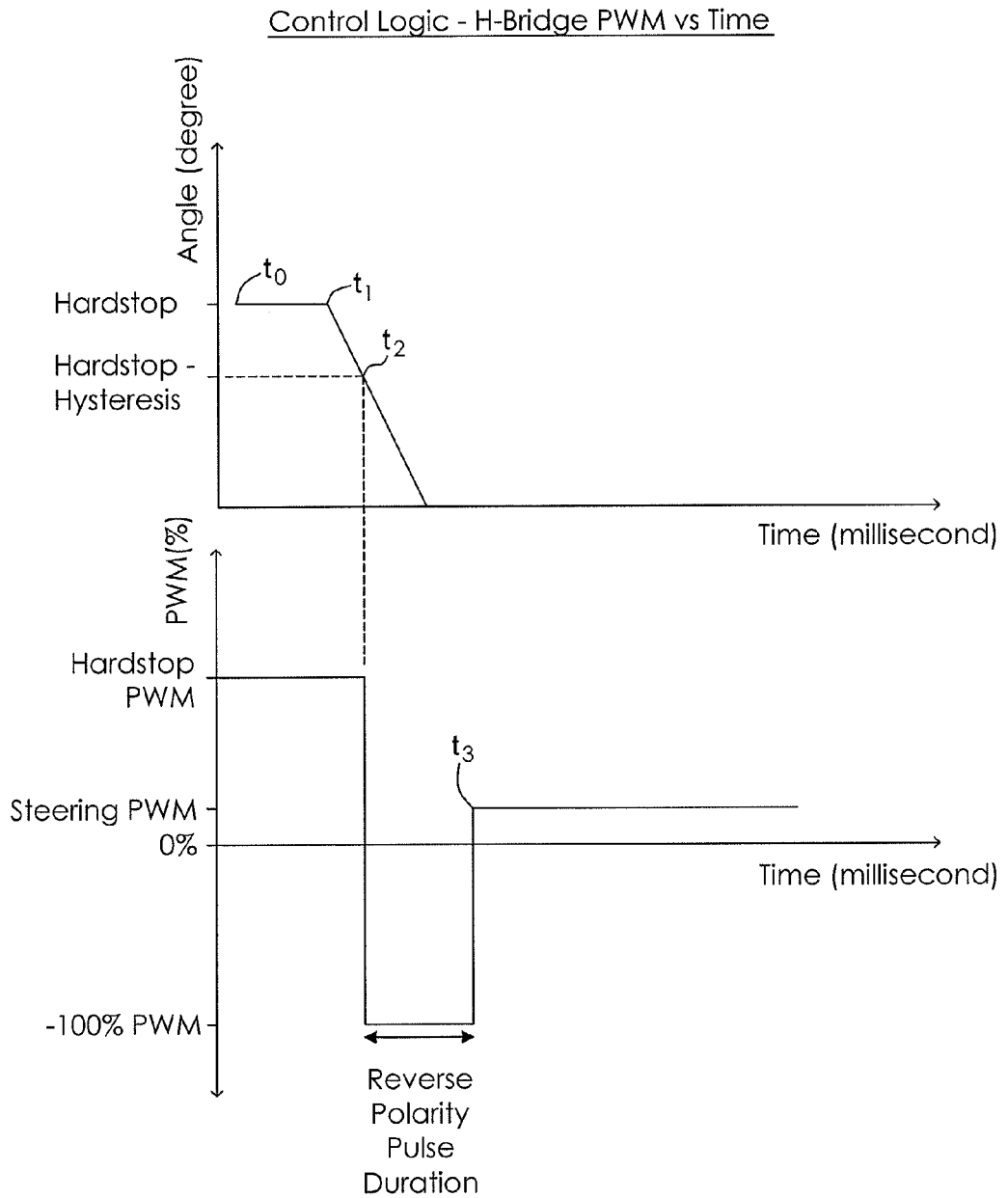

FIG. 5 illustrates the H-Bridge PWM control logic when steering away from a hardstop occurs. The top graph is a steering angle versus time plot and the bottom graph is a signed magnitude PWM versus time plot. The steering shaft 28 is at a hardstop at time $t_0$ and a hardstop PWM is applied to electromagnetic coil 48 of the helm 18, causing the stop mechanism 72 to fully engage the steering shaft. At time $t_1$ the steering shaft 28 starts to rotate away from the hardstop as permitted by the rotational play. At $t_2$ the steering shaft has been steered an angular distance equal to a hysteresis threshold, i.e. the steering position reaches 'Hardstop-Hysteresis'. This triggers the beginning of the reverse polarity pulse logic in the microcontroller 62. The microcontroller 62 drives the H-bridge driver 64 to apply a PWM voltage to the electromagnetic coil that has a reverse polarity compared to the hardstop PWM. This quickly decays the current in the electromagnetic coil 48 and neutralizes the magnetic hysteresis effect in the electromagnetic coil 48. The reverse polarity pulse also reduces the mechanical hysteresis effect in the stop mechanism assembly. The reverse polarity pulse duration in the example is between 15 and 20 milliseconds. The reverse polarity pulse ends at time $t_3$ and the H-bridge driver applies a steering resistance PWM to the electromagnetic coil that has the same polarity as the hardstop PWM. The steering effort at time $t_3$ will accordingly be very similar to the steering effort before the hardstop was engaged at time $t_0$. This is a result of the reverse polarity pulse.

Figure 6:
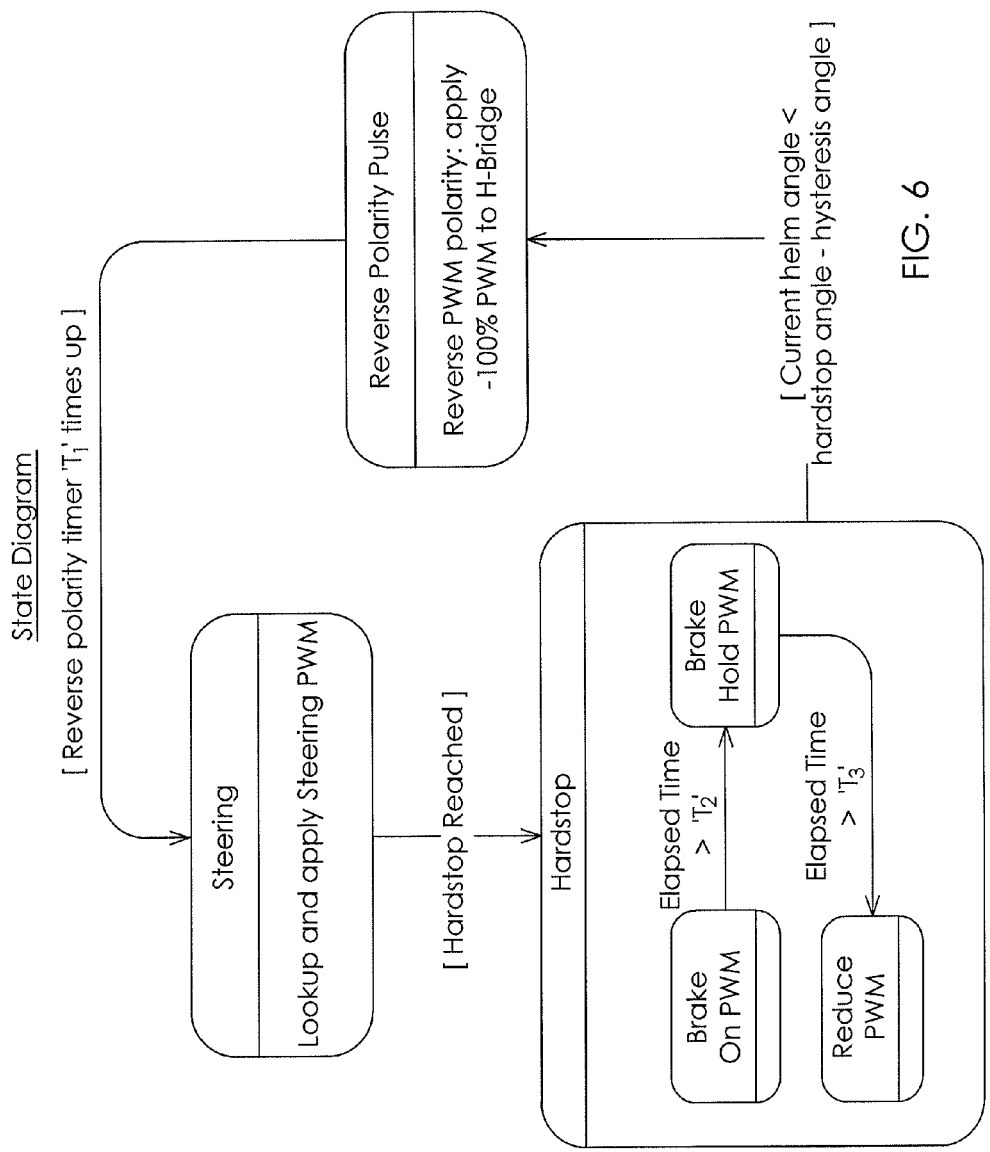
FIG. 6 is a state diagram of the control logic of the helm of the steering system of FIG. 1.

FIG. 6 illustrates the state diagram of the helm control logic. There are three main states, namely, a Steering State, Hardstop State, and Reverse Polarity Pulse State. In the Steering State, the microcontroller controls and varies the steering resistance by monitoring the different inputs of different sensors on the vehicle. For example, this may include inputs from the rotational sensor 66, shown in FIGS. 2 and 3, which functions as a steering position sensor and/or a vehicle speed sensor (not shown) to allow steering resistance to be correlated to vehicle speed, e.g. the higher the marine vessel speed, the higher the steering resistance. The logic enters the Hardstop State when the rotational sensor 66 senses a hardstop has been reached. The Hardstop State can be further defined into three sub-states. There is a Brake on PWM Sub-State which executes when the hardstop is reached and the microcontroller 62 drives the H-bridge driver 64 to apply the hardstop PWM. After a predetermined time $T_2$ has elapsed, one second in this example, the logic enters the Brake Hold PWM Sub-State and the microcontroller 62 drives the H-Bridge driver 64 to apply a lower PWM to the electromagnetic coil 48. The lower PWM is such that it maintains the same braking force but draws lower current. After a predetermined time T3 has elapsed, thirty seconds in this example, the logic enters a Reduce PWM Sub-State, and the PWM is lowered further to further lower current draw and prevent the electromagnetic coil from overheating. At any given time when the Hardstop State is being executed, if the steering shaft 28 has been steered away from a hardstop and reaches a position that is equal or less than hardstop angle-hysteresis angle, the logic transitions to the Reverse Polarity Pulse State. In the Reverse Polarity Pulse State, a reverse polarity pulse is applied for a fixed duration to remove the magnetic and mechanical hysteresis effect resulting from the hardstop PWM generated during the Hardstop State. The logic enters the Steering State again after a preset reverse polarity timer $T_1$ elapsed.

Figure 7:
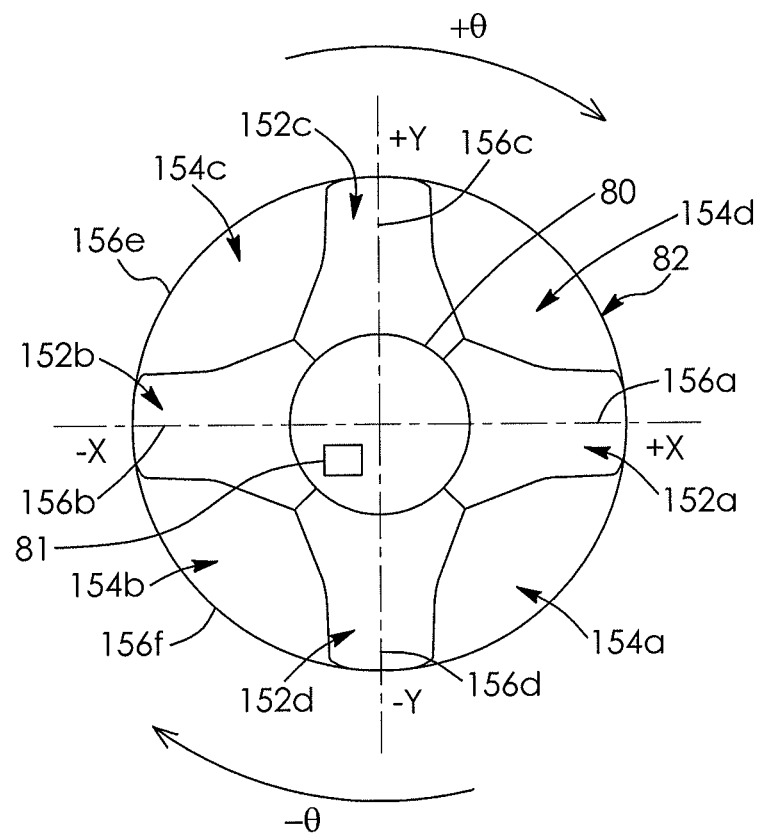
FIG. 7 is a simplified top plan view of a joystick of steering system of FIG. 1 showing the guided plate inside the joystick and the axes of movement of the joystick.

Referring back to FIG. 1, the control station 14 also supports a control head 76, an autopilot course compass unit (CCU) 78 or alternatively an autopilot course computer, and a joystick 80. The control head 76 is conventional and similar to the type disclosed in, for example, U.S. Pat. No. 8,347,859 which issued on Jan. 18, 2013 in the name of Garon et al. and the full disclosure of which is incorporated herein by reference. The CCU 78 and joystick 80 are also generally conventional. The joystick 80 is moveable along an X-axis, a Y-axis, and θ-axis as shown in FIG. 7. Movement of the joystick 80 along the X-axis may move the marine vessel 10 either starboard or port. Movement of the joystick 80 along the Y-axis may move the marine vessel 10 forward or in reverse. Movement of the joystick 80 along the θ-axis may rotate the marine vessel 10 starboard or port. The joystick 80 is also moveable along the X-axis, Y-axis, and θ-axis to allow for vector thrusting. The joystick can also be used to provide any combination of partial or full X-axis, Y-axis and θ-axis commands.

As best shown in FIG. 1, the helm 18 and joystick 80 are both plugged into a first CAN network 84 that allows the helm 18 and joystick 80 to communicate with a pump control module (PCM) 86. The PCM 86 controls the output of hydraulic pumps 88 and 90. Hydraulic conduits 92a and 92b hydraulically connect a first one of the hydraulic pumps 88 to a steering actuator 94 of the port engine 12a. Hydraulic conduits 96a and 96b hydraulically connect a second one of the hydraulic pumps 90 to a steering actuator 98 of the starboard engine 12b. The steering actuators 94 and 98 are hydraulic steering actuators, in this example, and respectively steer the port engine 12a and the starboard engine 12b in a manner known in the art and as described, for example, in U.S. Pat. No. 8,151,723 which issued on Apr. 10, 2012 to Winiski et al. and the full disclosure of which is incorporated herein by reference. The PCM 86 has a microcontroller (not shown in FIG. 1) and may receive manually inputted operator commands from the either the helm 18 or the joystick 80. The output of the hydraulic pumps 88 and 90 is based on the user input commands. Accordingly, the helm 18 and the joystick 80 may be used independently or together to steer the marine vessel 10.

The control head 76 and the joystick 80 are both plugged into a second CAN network 100 that allows the control head 76 and the joystick 80 to communicate with a shift actuator 102 and a throttle actuator 104 of the port engine 12a as well as a shift actuator 106 and a throttle actuator 108 of the starboard engine 12b. The CCU 78 is also plugged into the second CAN network 100 in this example. A push/pull cable 110 mechanically couples the shift actuator 102 to a transmission (not shown) of the port engine 12a and a push/pull cable 112 mechanically couples the throttle actuator 104 to a throttle (not shown) of the port engine 12a. Likewise a push/pull cable 114 mechanically couples the shift actuator 106 to a transmission (not shown) of the starboard engine 12b and a push/pull cable 116 mechanically couples the throttle actuator 108 to a throttle (not shown) of the starboard engine 12b. The shift and throttle actuators shift engine gears and increase or decrease engine throttle based on user input commands from either the control head 76 or the joystick 80 or both. The control head 76 commands shift and throttle functions in a manner similar to that described in U.S. Pat. No. 8,347,859 which issued on Jan. 18, 2013 in the name of Garon et al. The joystick 80 may also control shift and throttle functions based on movement of the joystick 80. Accordingly, the control head 76 and the joystick 80 may be used independently or together to control shift and throttle functions. It will be understood similar control schemes can be applied to marine vessels with more than two engines.

Since the joystick 80 plugs into both the first CAN network 84 and second CAN network 100, and can be used to both steer and control both shift and throttle functions, the marine vessel 10 is provided with two dedicated networks with the joystick 80 functioning as gateway. The gateway routes information from one network to another for redundancy. This removes the need for a third redundant network. Alternatively, with the use of the gateway, the joystick, control head, helm, pump control module, and shift and throttle actuator may be connected to the two functional specific networks differently for redundancy.

The plan view of a guided field plate 82, shown in FIG. 7, provides preferential joystick movement and tactile to assist control mode transitions. Thinner sections 152a, 152b, 152c and 152d of the guided field plate 82 provide less spring return force compared with the thicker sections 154a, 154b, 154c and 154d of the guided field plate 82. This guides the joystick 80 to move along the X-axis, Y-axis, and θ-axis which may be considered primary axes of the joystick 80. The guided field plate 82 has six primary zones of movement: the +X zone which is generally defined by the +X-axis and called out by reference numeral 156a; −X zone which is generally defined by the −X-axis and called out by reference numeral 156b; +Y zone which is generally defined by the +Y-axis and called out by reference numeral 156c, −Y zone which is generally defined by the −Y-axis and called out by reference numeral 156d; +θ zone which is generally defined by the +θ-axis and called out by reference numeral 156e; and −θ zone which is generally defined by the −θ-axis and called out by reference numeral 156b.

Figure 14:
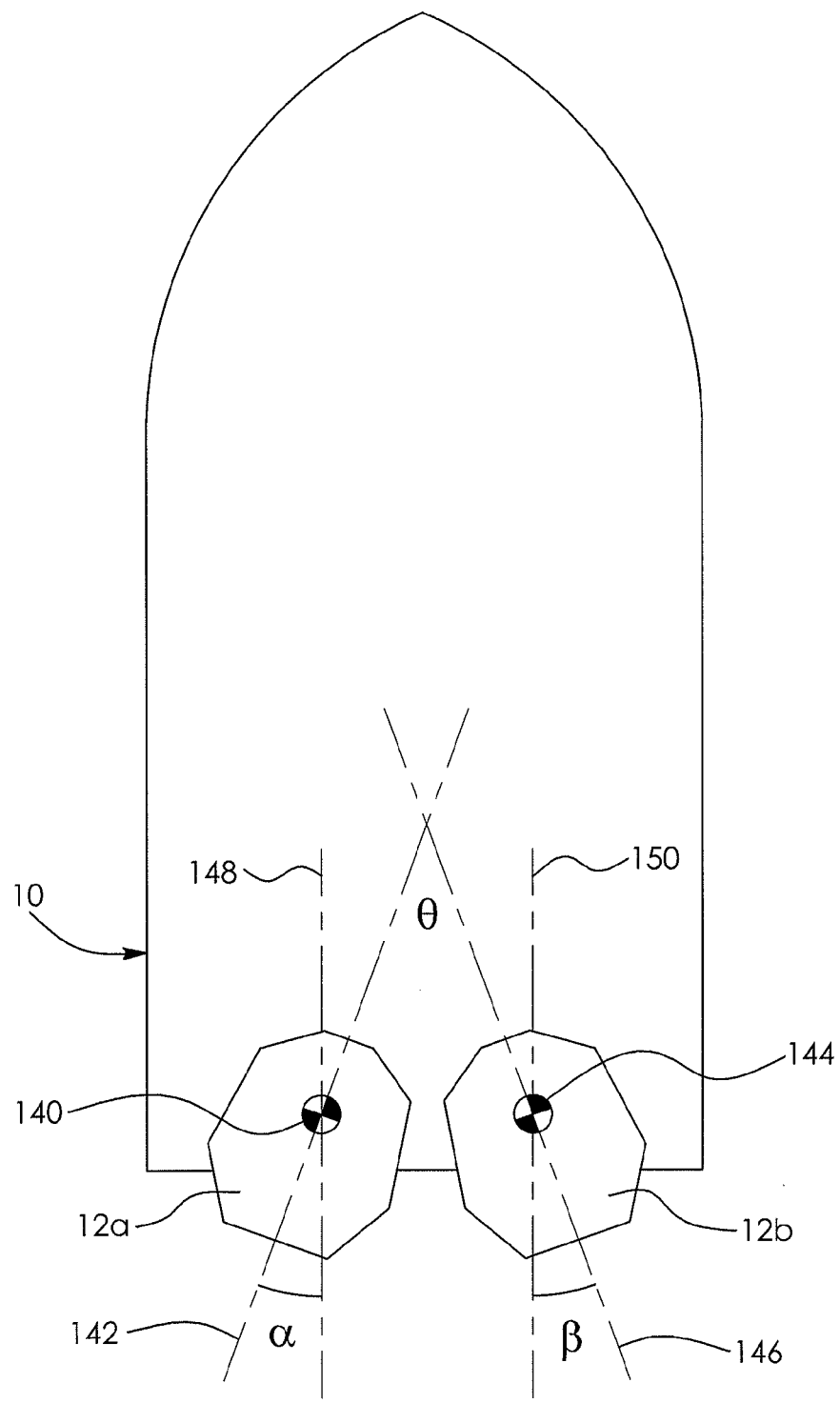

The gear position of the engines is constant in each zone. However, with the guided field plate 82, a user is encouraged to choose a primary zone to start steering. Once a zone is picked, the user can superimpose additional secondary motion or tertiary motion without changing the command of the shift actuator. For example, the user can naturally select the primary motion as +X with the aid of the guided field plate. This causes the rudders to spread outward, pointing to the center of rotation of the boat, as generally shown in FIG. 14. The port shift actuator engages in forward gear. The starboard actuator engages in reverse gear. The throttle actuators drive the engine in such a way that the forward thrust and reverse thrust are roughly equal. The boat moves in +X direction. While in +X zone, if the user requires −Y adjustment or correction due to engine imbalance, wind or water current; the user can pull the joystick slightly in −Y direction. The control logic contained in the microcontroller joystick reduces the command of the port throttle actuator. This causes a net reverse thrust of the vessel to move the vessel in the −Y direction. While in +X zone, if the user requires −θ adjustment or correction due to engine imbalance, wind or water current; the user can rotate the joystick slightly in −θ direction. The control logic contained in the microcontroller joystick further spread out the rudders. This causes a net turning moment of the vessel to rotate the vessel in the −θ direction. Once the primary zone is selected, all these actions can be achieved without shifting the gear positions. This helps to reduce clutch wear significantly. With systems shown in prior art, adding secondary motion correction would incur shifting gears that adds motion discontinuity, control delay and more wear of the clutch.

The joystick 80 may also be used for synchronized shifting. The engine speed is monitored at real time as disclosed in United States Patent Publication Number 2010/0280684 which was published on Nov. 4, 2010 in the name of Garon et al. and the full disclosure of which is incorporated herein by reference. When the engine speed is too high, such as above 1500 RPMs, the transmission load is too high to be pulled out of gear. A microcontroller 81 in the joystick 80 monitors both engine RPMs and will only send shift command to neutral commands when both engines are slow enough to shift out of gear. Likewise, the microcontroller 81 in the joystick 80 monitors both engine RPMs and will only send shift command to be in gear when both engines are ready to shift into gear. This is particular important for vector thrusting to avoid a sudden imbalance of thrust. The joystick 80 may further be used with redundancy power to steering is the single engine joystick mode. In the fault case of one engine is stopped either due to loss of electricity or engine stalled, the joystick 80 can be commanded in the +Y or −Y zone. With steering available on both engines and one engine thrust, the boat can move forward or reverse with rotation adjustment. This allows the user to get out of emergency situation.

Figure 8:
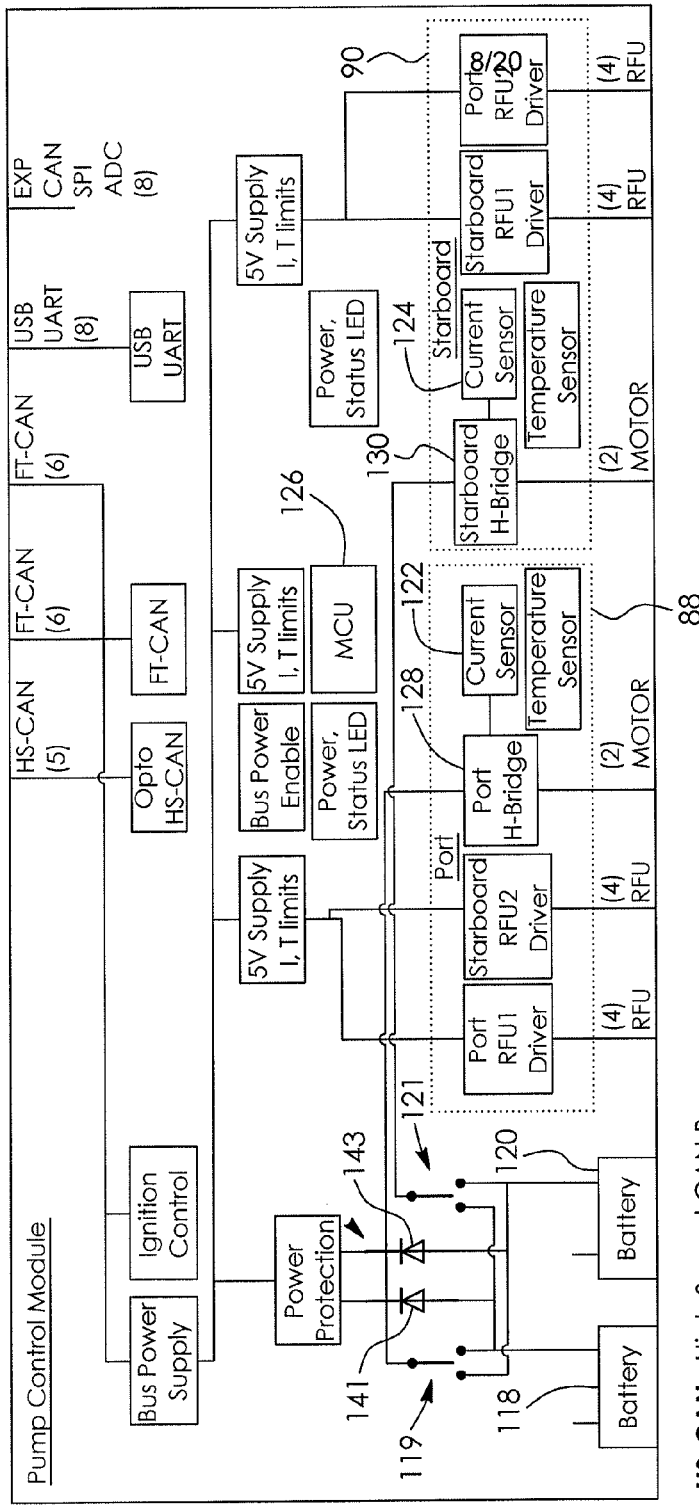
FIG. 8 is a schematic diagram showing of a pump control module of the steering system of FIG. 1.

The PCM 86 also functions as a gateway and has a redundant circuitry as shown in FIG. 8. Accordingly, the event of network failure of either the first CAN network 84 or the second CAN network 100, the joystick 80 or the PCM 86 can route the signal between devices near the joystick 80 to devices near the PCM 86. These nodes can still perform the steering and propulsion control functions with either full performance or at a reduced performance. Warning to the user can be displayed and sounded at the control station 14 at a display.

There are two posts for the battery 118 of the first hydraulic pump 88 and there are two posts for the battery 120 of the second hydraulic pump 90. The logic of the PCM 86 ensures that if the battery of one of the hydraulic pumps is weak then the battery of the other one of the hydraulic pumps will supply power to both hydraulic pumps 88 and 90. This allows the weak battery to charge while avoiding the need to shut down one of the outboard engines 12*a* and 12*b*. Mixing of the charging current between the batteries is limited and preferably avoided as mixing charging current may inadvertently drain both batteries. In addition, the batteries may have a different state of charge and state of voltage. Shorting two batteries may cause a large amount of instantaneous current flow.

Figure 9:
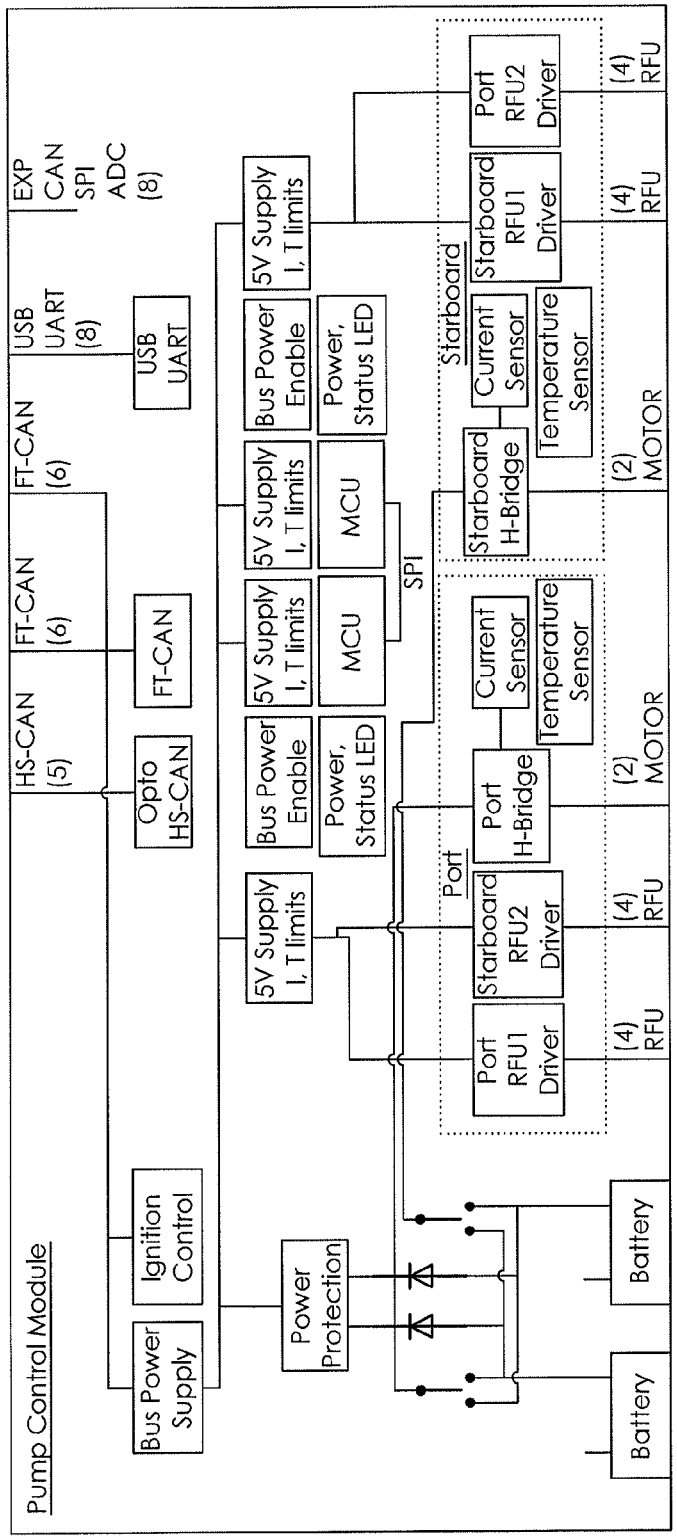
FIG. 9 is a schematic diagram showing of an alternative embodiment of the pump control module disclosed herein.

A relay 119 is connected to the first hydraulic pump 88 via the port H-bridge 128 and relay 121 is connected to the starboard hydraulic pump 90 via the starboard H-bridge 130. The relays 119 and 121 are of a single pole double throw type. For example, a pole of the relay 119 is connected to the port H-bridge 128 and two throws thereof are respectively connected to the batteries 118 and 120. Likewise a pole of the relay 121 is connected to the starboard H-Bridge 130 and two throws thereof are respectively connected to the batteries 118 and 120. Accordingly, each battery can supply current to both batteries 118 and 120. The batteries are not shorted due to the break before make characteristic of the relays 119 and 121. Combining the use of two relays, two sets of battery studs, and two pumps, this system can be tolerant to one battery power loss to provide steering function without additional complex electrical connections. It is possible to use solid-state devices, such as solid state relays, MOSFETs or transistors or even switches to archive similar purpose. There are also respective diodes 141 and 143 connected to each battery 118 and 120. The diodes 141 and 143 preferentially choose the higher voltage battery to supply to the low current circuitry such as the 5V supply. These diodes provide redundancy in the case of loss of one battery power. An alternative embodiment of the PCM is shown in FIG. 9.

An exemplary battery switching matrix is shown in FIG. 10. When a fault condition is detected in one of the batteries, the hydraulic pump performance will be derated and current will be taken from the other battery. For example, when a first battery is WEAK and a second battery is normal, the first hydraulic pump is derated and switched to the second battery for current. Likewise, when the second battery is WEAK and the first battery is normal, the second hydraulic pump is derated and is switched to the first battery for current. The fault conditions may be set within any desired parameters. In this example the WEAK voltage, LOW voltage, and HIGH voltage thresholds to trigger a fault are set out in FIG. 11. A battery is considered WEAK when battery voltage is less than 11.5V for thirty seconds and is cleared from being WEAK when battery voltage is greater than 12.5V for thirty seconds and the time since the battery was last considered WEAK is greater than $n^2$ seconds where n=number of faults. A battery is considered LOW when battery voltage is less than 8V for one millisecond and is cleared from being LOW when battery voltage is greater than 12.5V for one millisecond and the time since the battery was last considered WEAK is greater than $n^2$ seconds where n=number of faults. The H-bridge uses MOSFET transistors. It is known that when the gate voltage of the MOSFET is low, the transistor ON resistance is high which may cause overheating of the MOSFET. This arrangement allows to H-bridge to be switched away from the LOW battery to avoid driving the MOSFET with LOW voltage.

A battery is considered HIGH when battery voltage is greater than 24V for one millisecond and is cleared from being HIGH when the battery voltage is less than 16V for one millisecond and the time since the battery was last considered HIGH is greater than $n^2$ seconds where n=number of faults. Battery voltage is determined by a voltmeter or other suitable means. Current flow to the hydraulic pumps 88 and 90 is measured using respective current sensors 122 and 124 which are shown in FIG. 7. Similar to the explanation as in the low voltage condition, the MOSFET can be damaged by a failure mode called avalanche when subject to a HIGH voltage. This arrangement allows to H-bridge to be switched away from the LOW battery to avoid driving the MOSFET with LOW voltage. In summary, combining the use of two relays, two sets of battery studs, and two pumps, this system can be tolerant to one battery power loss to provide steering function and to be protected for low voltage and high voltage hazards.

Figure 12:
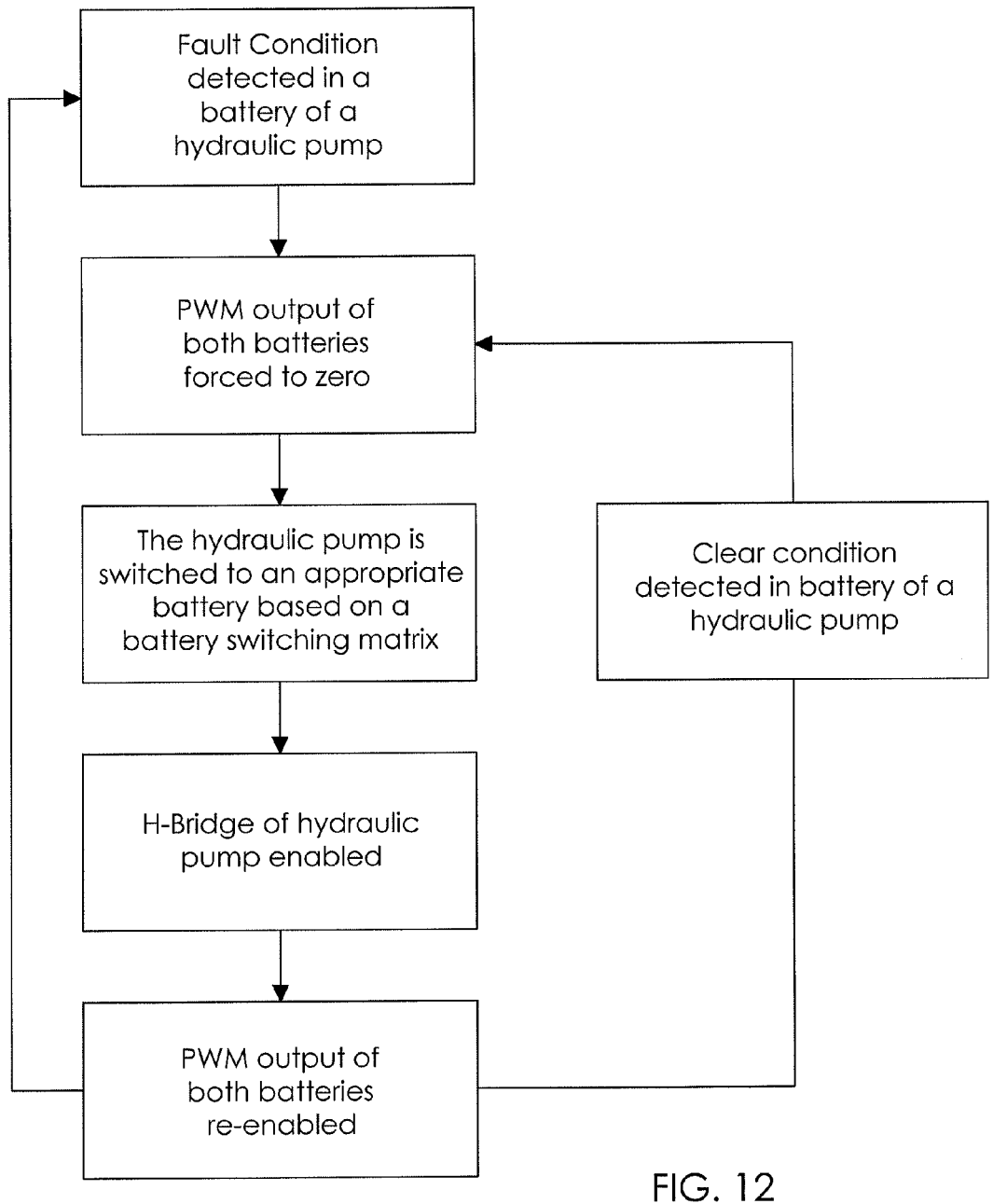
FIG. 12 is a flow chart showing a battery switching logic of the pump control module of FIG. 8.

A microcontroller 126 of the PCM 86, also shown in FIG. 8, causes the hydraulic pumps to switches batteries as show in FIG. 12. The microcontroller 126 forces the PWM output of both batteries to zero when a fault condition is detected. The microcontroller may also disable the function the H-bridge driver which put all MOSFET in a high impedance state. When the battery supply is switching, the pole of the relay loses its current source; it is important to turn off the MOSFET to avoid an inductive kick back or low voltage conditions. The microcontroller 126 then switches the hydraulic pump to the appropriate battery based on the battery switching matrix of FIG. 10. For example, if the first battery is LOW and the second battery is WEAK the first hydraulic pump 88 will be switched to the second battery 120. The microcontroller will re-enable both PWM outputs if the respective H-Bridges 128 and 130, shown in FIG. 8, of the hydraulic pumps 88 and 90 are enabled. Following the example above, the microcontroller 126 will cause the first hydraulic pump to switch back to the first battery 118 once the fault condition is cleared, i.e. when the battery voltage of this first battery is greater than 12.5V for one millisecond and the time since the battery was last considered LOW is greater than $n^2$ seconds where n=number of faults. Again the microcontroller 126 forces the PWM output of both batteries 118 and 120 to zero then switches the first hydraulic pump 88 back to the first battery 118. The hydraulic pumps 88 and 90 are preferably powered by their respective battery but switching is possible. Battery switching as described above helps protect the PCM 86 from damage. When one of the H-Bridges 128 or 130, and the corresponding hydraulic pumps 88 or 90, are temporarily turned off due to relay switching, the hydraulic pump is also temporarily turned off to provide synchronized steering movement.

Figure 13:
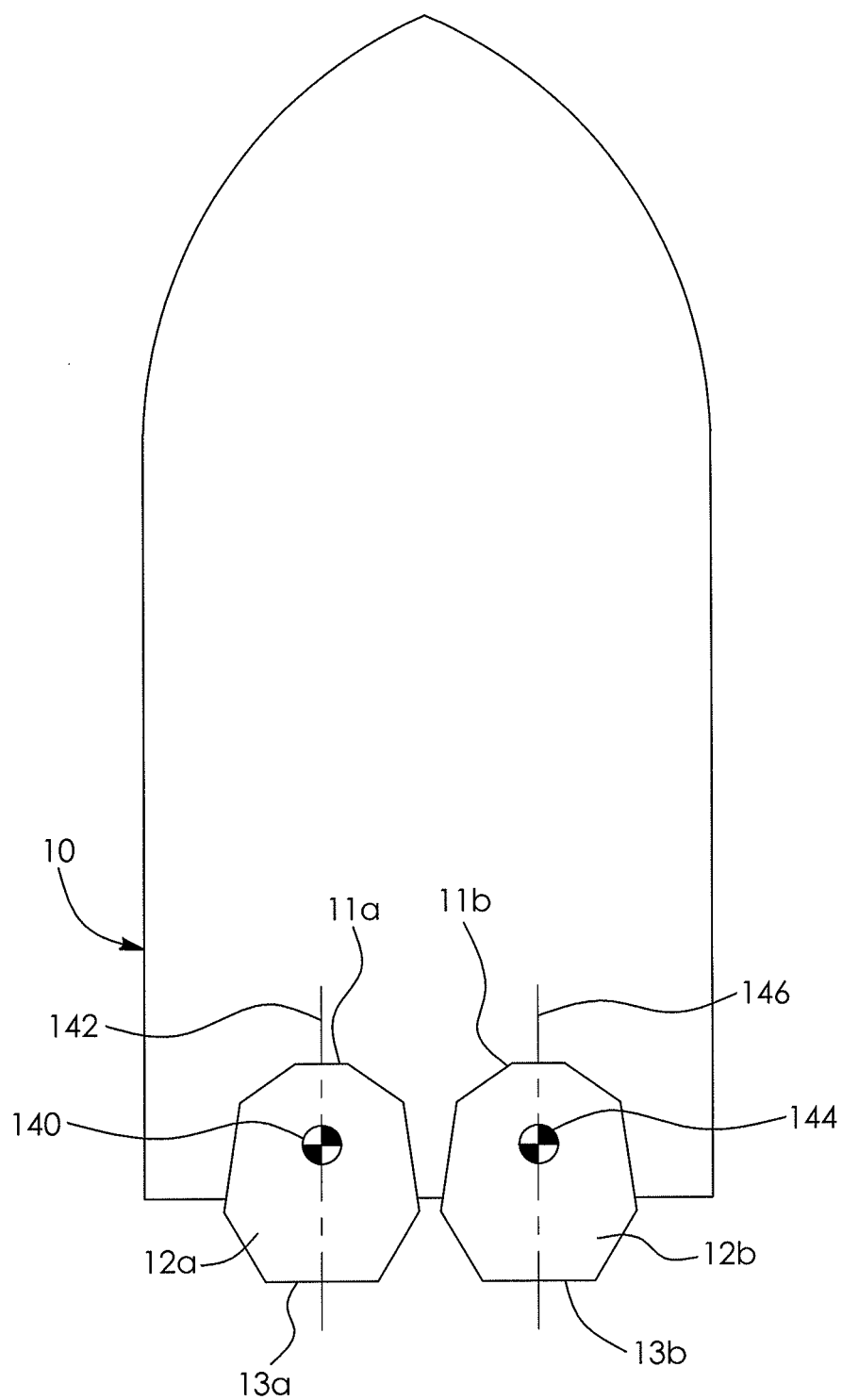
FIGS. 13 to 17 are simplified schematic diagrams showing relative movement of the outboard port engine and outboard starboard engine of the steering system of FIG. 1.

The PCM 86 also prevents the port engine 12*a* and starboard engine 12*b* from colliding as they are steered. As shown in FIG. 13 the port engine 12*a* has a swivel axis 140 which corresponds to the steering axis thereof. The port engine 12*a* also has a longitudinal axis 142 which extends from a front 11*a* of the port engine 12*a* through the swivel axis 140 of the port engine 12*a* to a rear 13*a* of the port engine 12*a*. Likewise the starboard engine 12*b* has a swivel axis 144 and a longitudinal axis 146 which extends from a front 11*b* of the starboard engine 12*b* through the swivel axis 144 of the starboard engine 12*b* to a rear 13*b* of the starboard engine 12*b*. In this example the distance between the swivel axes 140 and 144 is between twenty-four inches and thirty-four inches though this distance could vary based on the make and model of the outboard engines 12a and 12b.

Figure 15:
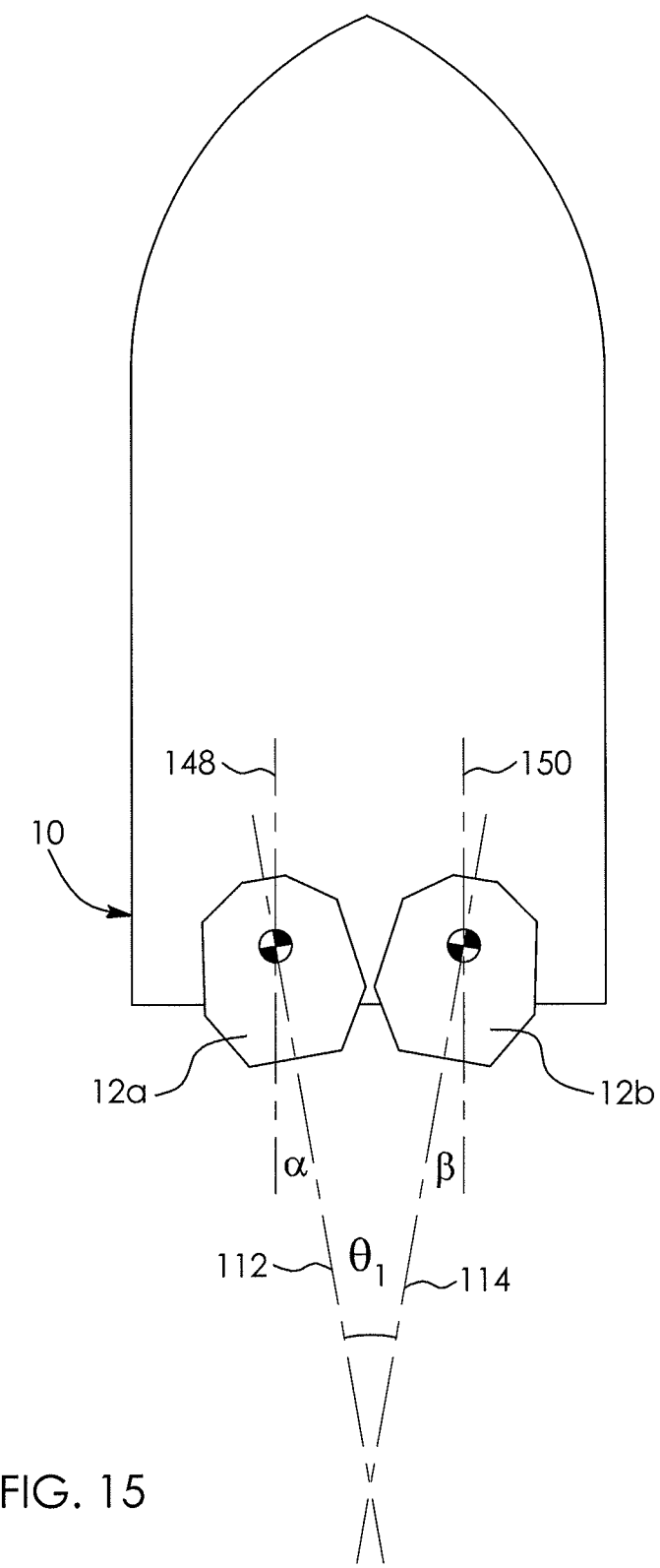

FIG. 14 shows a marine vessel longitudinal axis 148 for the port engine 12a which is defined as an axis going through the swivel axis 140 of the port engine 12a parallel to the bow-astern direction of the marine vessel 10. A steering angle α of the port engine 12a is defined as the angle between the engine longitudinal axis 142 of the port engine 12a and the marine vessel longitudinal axis 148 for the port engine 12a. FIG. 13 also shows a marine vessel longitudinal axis 150 for the starboard engine 12b which is defined as an axis going through the swivel axis 144 of the starboard engine 12b parallel to the bow-astern direction of the marine vessel 10. A steering angle β of the starboard engine 12b is defined as the angle between the starboard engine longitudinal axis 146 of the starboard engine 12b and the marine vessel longitudinal axis 150 for the starboard engine 12b. FIG. 15 shows an angle $\theta_1$ between the port engine 12a and the starboard engine 12b which is equal to the steering angle α of the port engine 12a less the steering angle β of the starboard engine 12b with steering angles α and β being measured as positive towards starboard and negative towards port. For example, in FIG. 14 the steering angle α of the starboard engine 12a is negative and the steering angle β of the starboard engine 12b is positive while in FIG. 15 a steering angle of the port engine would be positive and a steering angle of the starboard engine 12b would be positive. It would be understood that in other examples the steering angles may by measured negative towards port and positive towards starboard.

When the fronts 11a and 11b of the outboard engines 12a and 12b point towards each other, as shown in FIG. 14, the engine cowlings will generally clear one another. However, when the fronts 11a and 11b of the outboard engines 12a and 12b point away from each other, as shown in FIG. 15, the engine cowlings may collide. In particular, when the angle θ between the longitudinal axes 142 and 146 of the engines 12a and 12b is positive and greater than a collision threshold angle, the engine cowlings may collide. To avoid a collision, movement of the outboard engines 12a and 12b in a direction that increases the angle θ between the outboard engines 12a and 12b will be arrested when a collision threshold angle is reached. Movement of the outboard engines will however be allowed in a direction that decreases the angle θ between the outboard engines 12a and 12b when the collision threshold angle is reached. The collision threshold angle is stored by the microprocessor 126 of the PCM 86, which is shown in FIG. 7, and outboard engine movement is controlled by the PCM 86 as described above.

Figure 16:
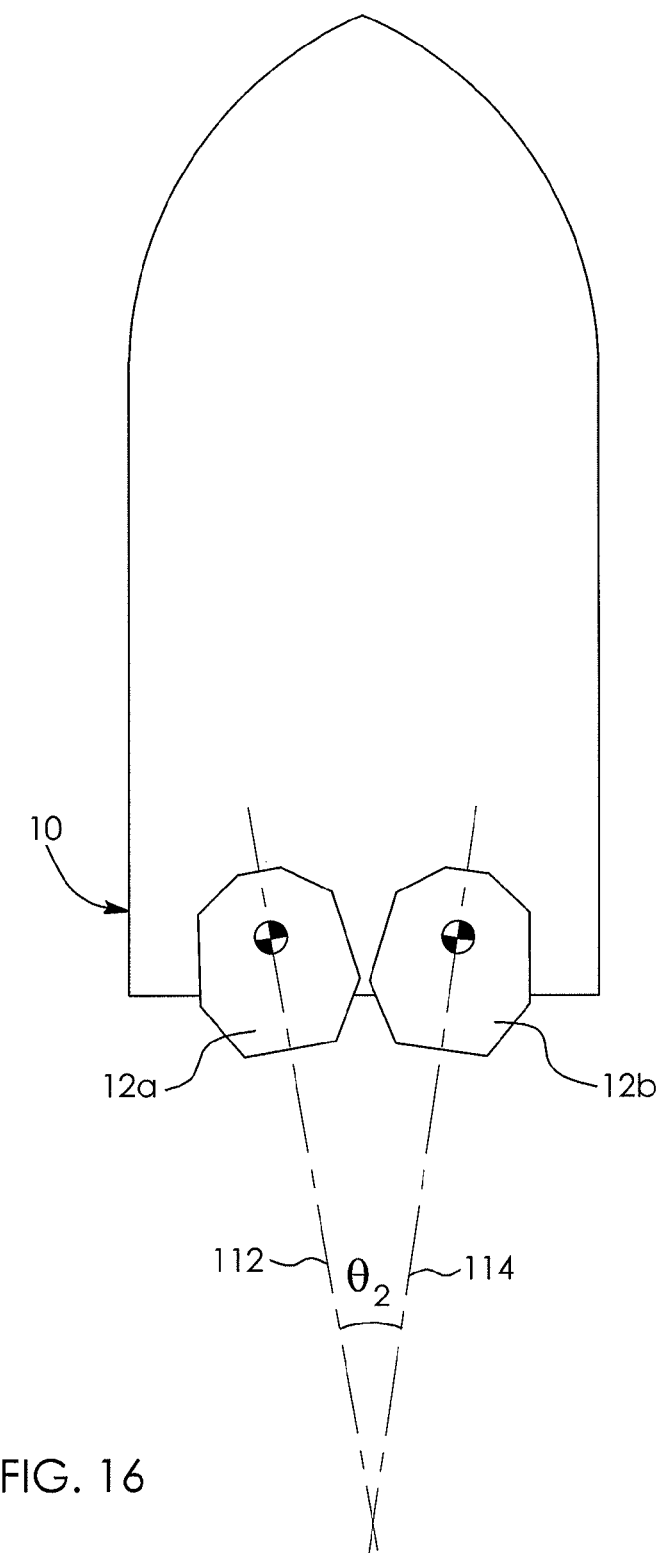
Figure 17:
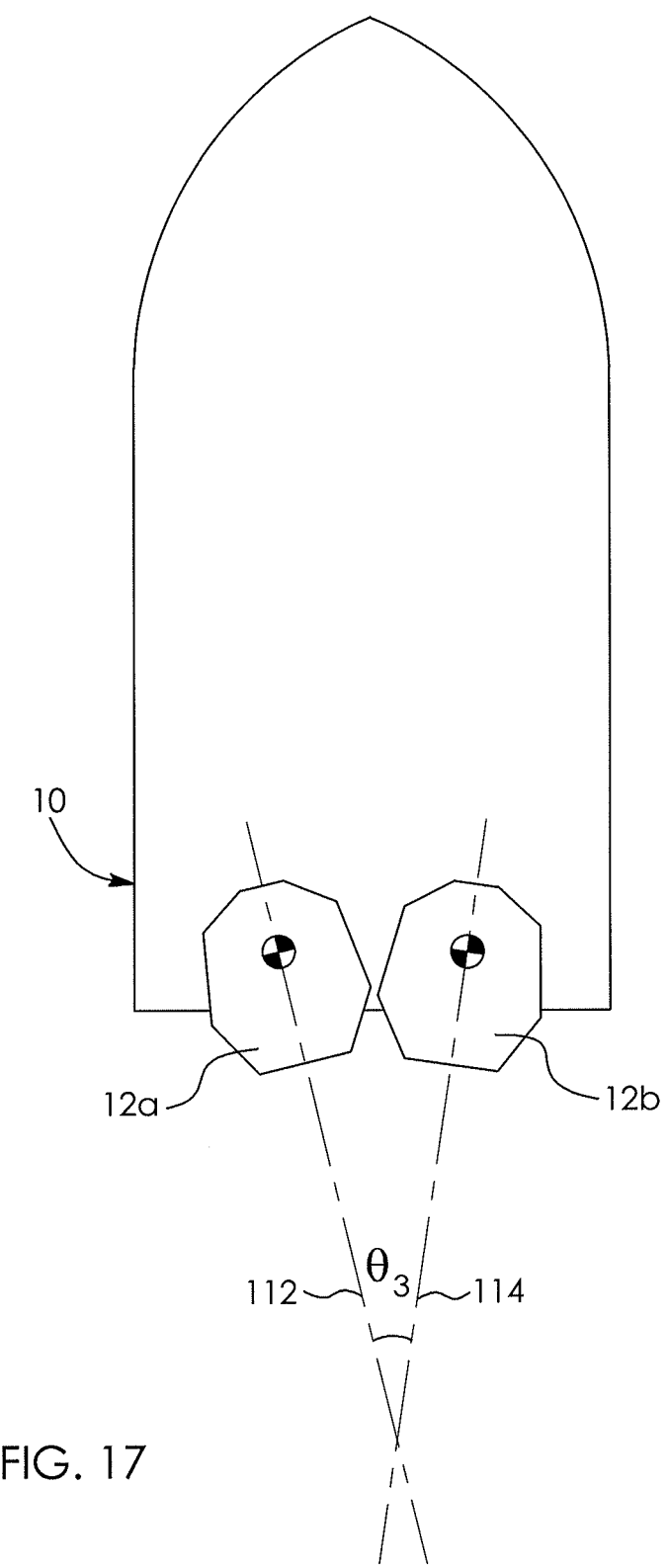
Figure 18:
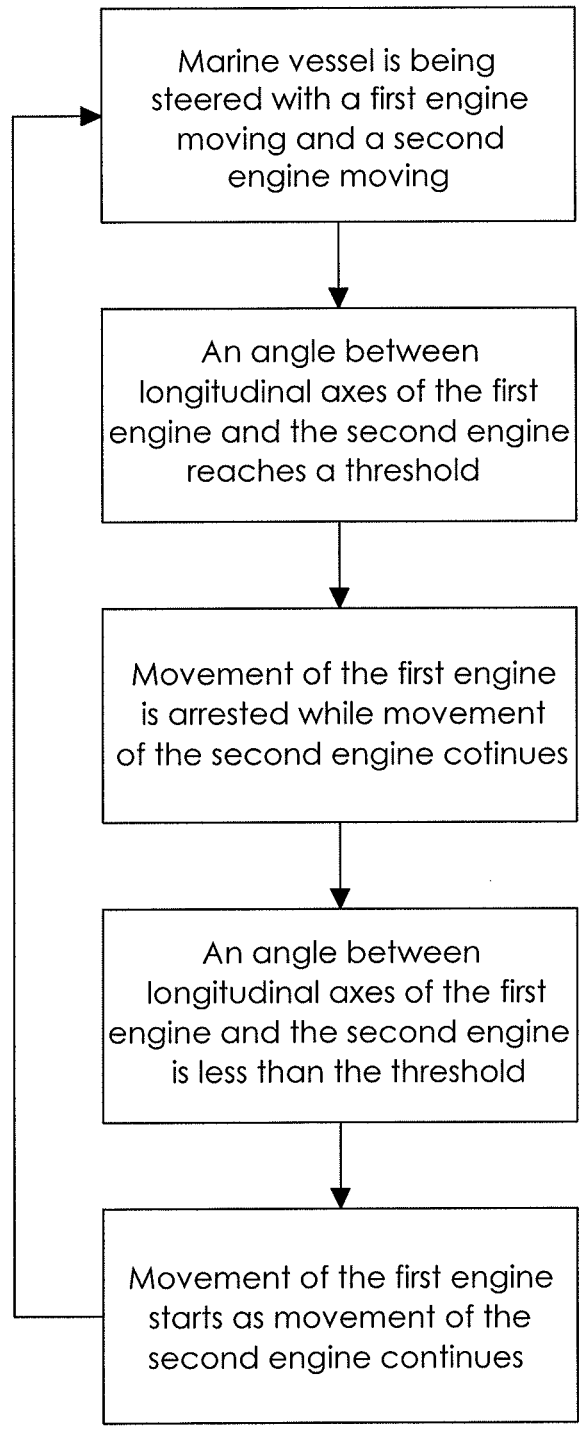
FIG. 18 is a flows chart showing a logic for controlling movement of the outboard port engine and outboard starboard engine of the steering system of FIG. 1.

Controlling the movement of the outboard engines 12a and 12b, based on the angle θ between the engines 12a and 12b, allows for more refined control and collision avoidance. For example, as shown FIG. 15, when the angle $\theta_1$ between longitudinal axes 115 and 125 of the outboard engines 12a and 12b reaches the threshold as a result of the port engine 12a moving faster than the starboard engine 12b, then movement of the port engine 12a is arrested while movement of the starboard engine 12b continues, as shown in FIG. 16, until the angle $\theta_2$ between the longitudinal axes 114 and 116 of the outboard engines 12a and 12b is less than a clear threshold angle. The clear threshold angle is also stored by the microprocessor 126 of the PCM 86 which is shown in FIG. 7. Movement of the port engine 12a will be resumed once the clear threshold angle is reached as shown in FIG. 17. Additionally the rate of movement commands may be limited or synchronized to maintain steering of the outboard engines 12a and 12b at a similar speed in real time. The collision threshold angle and clear threshold angle are functions of the types of engines and the distances between the swivel axes of adjacent engines. FIG. 18 shows a flows chart illustrating the logic for controlling movement of the engines 12a and 12b, based on the angle θ between the outboard engines 12a and 12b, to allow for more refined control and collision avoidance.

Figure 19:
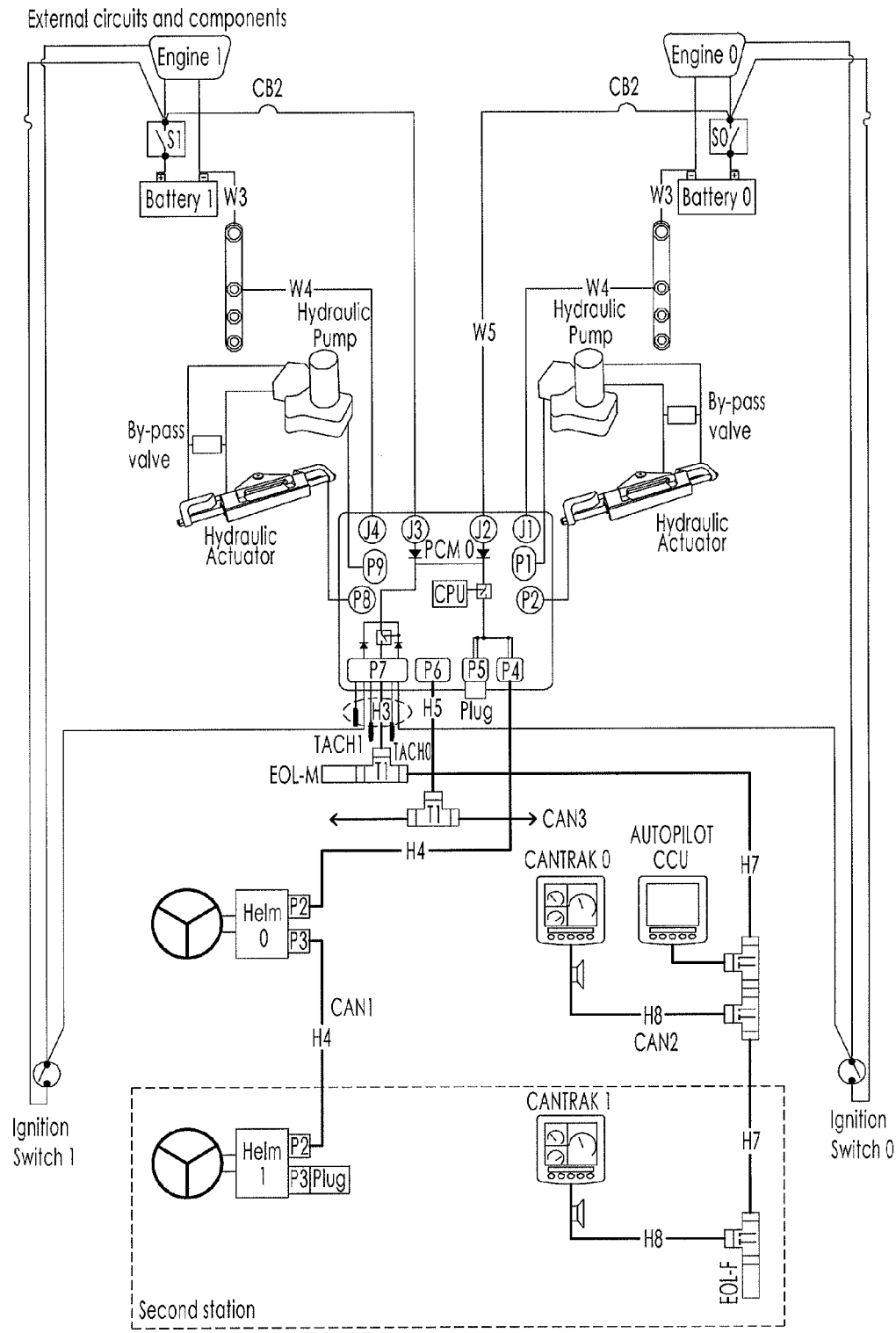
FIGS. 19 and 20 are simplified schematic diagrams showing alternative embodiments of the improved steering system disclosed herein.
Figure 20:
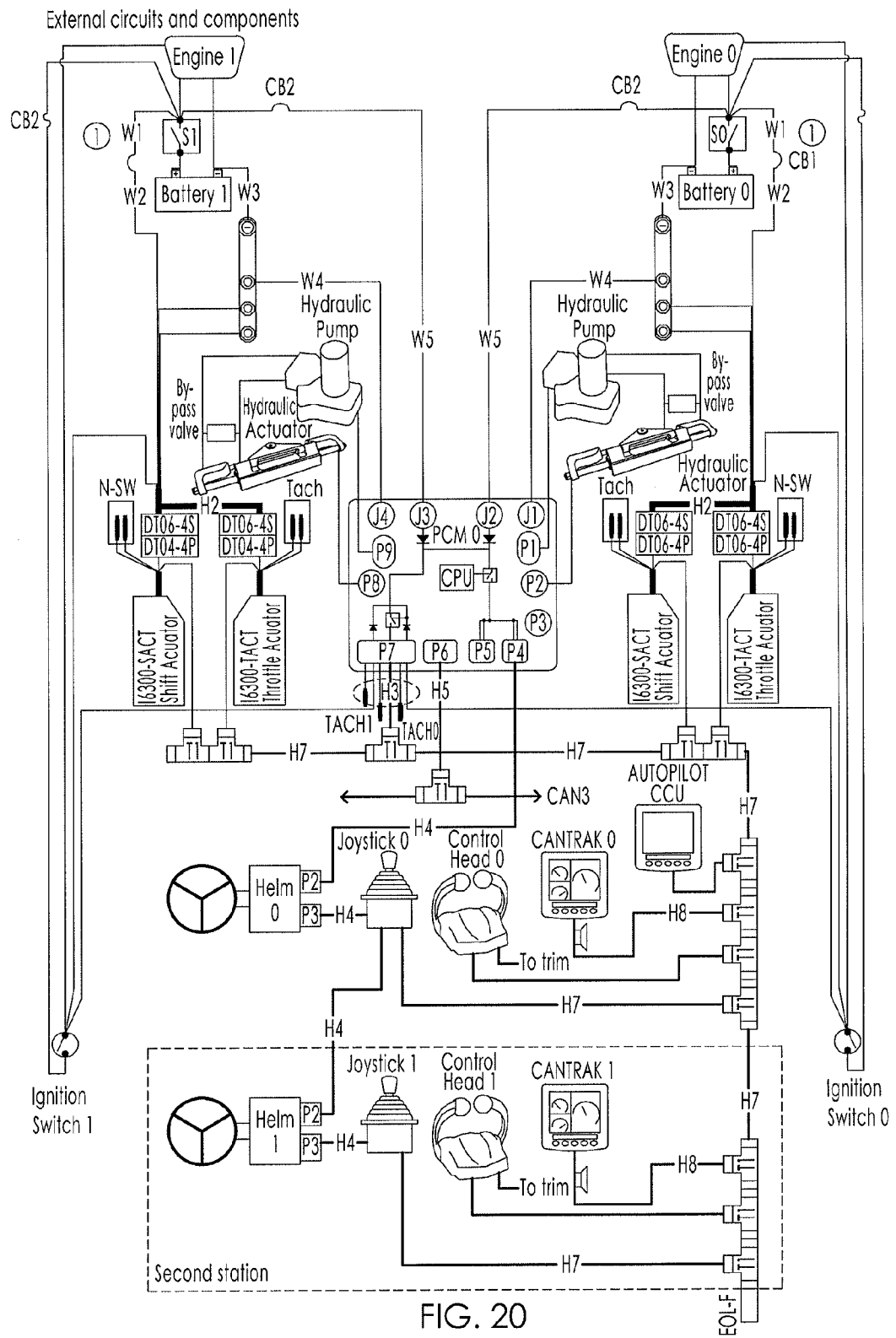

FIGS. 19 and 20 are simplified schematic diagrams showing alternative embodiments of the improved steering system disclosed herein in which the marine vessel is provided with a second control station. A CanTrak display may provides audible and visual warning to user. As well, it provides run time information of the vessel such as rudder angles, gear positions, throttle commands, trim angles and engine RPMs. It is obviously that for many failure mode and fault tolerant cases described. The display can be used to warn the user of a warning or a danger. The engine speed input 151 provides engine speed information to the system.

It will be understood by a person skilled in the art that many of the details provided above are by way of example only, and are not intended to limit the scope of the invention which is to be determined with reference to the following claims.

What is claimed is:

1. A steering system for a marine vessel comprising:
a first engine, a first hydraulic steering actuator for steering the first engine, and a first hydraulic pump for supplying hydraulic fluid to the first steering actuator;
a first shift actuator for shifting gears in the first engine and a first throttle actuator for increasing or decreasing throttle to the first engine;
a second engine, a second hydraulic steering actuator for steering the second engine, and a second hydraulic pump for supplying hydraulic fluid to the second steering actuator;
a second shift actuator for shifting gears in the second engine and a second throttle actuator for increasing or decreasing throttle to the second engine;
a pump control module for controlling an output of the first hydraulic pump and an output of the second hydraulic pump;
a helm for providing user inputted steering commands to the pump control module;
a joystick for providing user inputted steering commands to the pump control module and for providing user inputted shift and throttle commands to the first shift actuator and the first throttle actuator and to the second shift actuator and the second throttle actuator;
a control head for providing user inputted shift and throttle commands to the first shift actuator and the first throttle actuator and to the second shift actuator and the second throttle actuator; and
a first CAN network and a second CAN network, wherein the helm or the joystick provides user inputted steering commands on the first CAN network and the control head or the joystick provides user inputted shift and throttle commands on the second CAN network.

2. The steering system as claimed in claim 1 wherein:
the joystick provides user inputted shift and throttle commands to the first shift actuator and the first throttle actuator; and
the joystick provides user inputted shift and throttle commands to the second shift actuator and the second throttle actuator.

3. The steering system as claimed in claim 1 wherein the helm includes:
- a rotatable steering shaft;
- a sensor which senses angular movement of the steering shaft as a vehicle is being steered;
- a stop mechanism which releasably engages the steering shaft to prevent rotation of the steering shaft;
- an electromagnetic actuator which actuates the stop mechanism to engage or release the steering shaft;
- a microcontroller which causes the electromagnetic actuator to actuate the stop mechanism to fully engage the steering shaft when the sensor senses that the steering shaft has reached a hardstop position to prevent rotation of the steering shaft in a first rotational direction, which corresponds to movement towards the hardstop position, while allowing rotational play between the steering shaft and the stop mechanism in a second direction, which corresponds to rotational movement away from the hardstop position; and
- a driver which applies a reserve polarity pulse to the electromagnetic actuator when the stop mechanism is fully engaged with the steering shaft and the steering shaft is rotated, as permitted by the rotational play, in the second rotational direction.

4. The steering system as claimed in claim 3 wherein the stop mechanism includes a multi-plate clutch, the multi-plate clutch having a plurality of clutch plates which are urged into frictional engagement with each other by the electromagnetic actuator to engage the steering shaft.

5. The steering system as claimed in claim 3 wherein the electromagnetic actuator includes an electromagnetic coil, a mounting plate and an armature, and wherein the clutch plates are disposed between the electromagnetic coil and the armature.

6. The steering system as claimed in claim 5 further including a shim between the electromagnetic coil and the mounting plate to set the electromagnetic coil and the mounting plate at a predetermined clearance.

7. The steering system as claimed in claim 5 further including a spring which preloads the clutch plates for improved gap control.

* * * * *